US009402343B1

(12) United States Patent
Allochis

(10) Patent No.: US 9,402,343 B1
(45) Date of Patent: Aug. 2, 2016

(54) FLEXIBLE CUTTERBAR ASSEMBLY FOR A HARVESTING PLATFORM

(71) Applicant: Jose Luis Allochis, Buenos Aires (AR)

(72) Inventor: Jose Luis Allochis, Buenos Aires (AR)

( * ) Notice: Subject to any disclaimer, the term of this patent is extended or adjusted under 35 U.S.C. 154(b) by 0 days.

(21) Appl. No.: 14/694,173

(22) Filed: Apr. 23, 2015

(51) Int. Cl.
| A01D 43/00 | (2006.01) |
| A01D 34/86 | (2006.01) |
| A01D 57/16 | (2006.01) |
| A01D 57/02 | (2006.01) |
| A01D 75/18 | (2006.01) |
| A01D 61/02 | (2006.01) |

(52) U.S. Cl.
CPC .............. *A01D 34/866* (2013.01); *A01D 57/02* (2013.01); *A01D 57/16* (2013.01); *A01D 61/02* (2013.01); *A01D 75/182* (2013.01)

(58) Field of Classification Search
CPC ....... A01D 41/14; A01D 57/20; A01D 43/06; A01D 61/002; A01D 41/16
USPC .......................................................... 56/181
See application file for complete search history.

(56) References Cited

U.S. PATENT DOCUMENTS

| 6,272,823 B1 * | 8/2001 | Yeomans | A01D 41/14 56/158 |
| 6,675,568 B2 * | 1/2004 | Patterson | A01D 41/14 56/208 |
| 7,614,206 B2 * | 11/2009 | Tippery | A01D 41/144 56/15.8 |
| 7,918,076 B2 * | 4/2011 | Talbot | A01D 41/14 56/208 |
| 7,930,871 B1 * | 4/2011 | Figgins | A01D 41/141 56/208 |
| 7,992,372 B1 * | 8/2011 | Coers | A01D 41/14 56/153 |
| 8,087,224 B1 * | 1/2012 | Coers | A01D 41/144 56/153 |
| 2007/0193243 A1 * | 8/2007 | Schmidt | A01D 41/14 56/181 |
| 2009/0277146 A1 * | 11/2009 | Sauerwein | A01D 41/14 56/208 |
| 2012/0042617 A1 * | 2/2012 | Dow | A01D 61/002 56/14.5 |
| 2014/0041354 A1 * | 2/2014 | Coon | A01D 41/14 56/158 |
| 2014/0075912 A1 * | 3/2014 | Fuechtling | A01D 41/14 56/181 |

* cited by examiner

Primary Examiner — Árpád Fábián-Kovács
(74) Attorney, Agent, or Firm — Defillo & Associates, Inc.; Evelyn A Defillo

(57) ABSTRACT

The present invention relates to a flexible agricultural platform characterized by having a plurality of support arms constructed especially composed of multiple sections hinged together, arranged to hold the cutterbar assembly. The set of multiple-beam pivoting arms used to hold the cutting mechanism of a draper conveyor type agricultural platform on multiple support points evenly distributed across the width of the main frame, and in a manner to admit the cutterbar to flex along its width—without intermediate rigid sections—in response to changes in the curvature of field while the platform is advanced.

22 Claims, 24 Drawing Sheets

FLEXIBLE CUTTERBAR ASSEMBLY FOR A HARVESTING PLATFORM

FIELD OF THE INVENTION

The present invention relates to a flexible agricultural platform characterized by having a plurality of support arms constructed especially composed of multiple sections hinged together, arranged to hold the cutterbar assembly. More specifically, the present invention relates to a set of multiple-beam pivoting arms used to hold the cutting mechanism of a draper conveyor type agricultural platform on multiple support points evenly distributed across the width of the main frame, and in a manner to admit the cutterbar to flex along its width—without intermediate rigid sections—in response to changes in the curvature of field while the platform is advanced.

BACKGROUND OF THE INVENTION

A platform used in agriculture harvesting crops is universally defined as a head attached to a harvesting machine and that serves as a removable attachment for use when cutting requirements are request. It is made and assembled onto a main frame or main frame which is divided into a central section, the area corresponding to coupling with the harvester, and two side sections—wings—, that projects on either side of said central section according to a perpendicular direction to the advance direction of the harvesting machine. The platform has a cutting mechanism—cutterbar—projecting laterally across the width thereof, defined in front of the side sections and center section, and is configured to sever the standing crop.

Platforms contain a system for the transverse movement of the crop material. Typically it is formed by a helical screw conveyor and alternately today there exist systems containing a set of canvas or drapers for conveying. Both the canvas—draper—and the screw conveyor operate to transport the crop cut by the cutterbar and drive it into the center section. Furthermore, it is well known there are multitudes of arrangements where gadgets are used to force the material that reaches the center section of platform to pass through the feederhouse—and to the combine's feeder thereof—, to be later threshed by the harvester. Each prior art heads prefer one of these devices and determine the input mode of the crop material to the feeder of the harvester.

It is known that the cutterbar of some cutting platform is configured to flex in response to ground shape. In these, a series of sliding plates—skid shoes—are linked to said cutterbar to confer the ability to settle above the ground and slipping while operating. All this in view of making the cut of the plant as close to the ground as possible in practice, allowing the collection of those pods with beans sprouting in the lower part of the stem. Thus, when the head is advanced in work, the cutterbar is positioned virtually glued to the ground and curling up to mimic the natural unevenness of the field, resulting into a crop cut at constant height. While this is well known in theory, most platform transitions from the flexible cutterbar to the auger/draper does not respect a good design of the cutterbar. In the chase of shortening the distance between the front edge of the draper conveyor and the cutting zone, most manufacturers have not developed a really effective, good angled, low losses cutterbar systems.

Traditional platforms—be it platforms using configurations according to prior art technologies—implemented for cutting crops such as soybeans, wheat, barley, safflower or bean (among others) usually comprise a single conveyor belt which projects forward from the main frame—in an oblique downward direction, describing a driving surface for the crop material that extends to the cutterbar, without interruption—. These arrangements have a number of drawbacks and limitations that separate the operation of the drapers from the ideal operation form. Firstly, the prior art usually platforms are constructed so that the angle formed by the upper run of the belt with the ground is too aggressive (large), so that there is greater potential for the loose grains to slide to the ground (and therefore lost from being processed).

Another drawback associated with these primitive configurations is that the beams which support the cutting mechanism are typically projected at an angle describing a great slope. As for some types of crops it is necessary that the cutterbar is as close to the ground as possible, it is common that the front ends of said beams are supported above the ground to slide over while the platform is advanced and therewith follow the natural contour. Reasonably, it often happens that the beams undergo a partial digging and consequently drag a part of the uppermost layer of the soil, and potentially breaking some mechanism of the platform.

Secondly, there is the design robustness necessary in the construction of each support arm. In prior art mechanisms, cantilevered loads appearing around the pivot axis of the beams tend to be enormous. This corresponds to the great length from the cutterbar to the fulcrum of the support beams. Support beams where designed to project from the rear of the platform—at the main frame—to the very front to hold the cutterbar, with the rotary point positioned on the rear of the beam and in this manner causing a huge lever effect.

Additionally, in prior art platforms there are some complications regarding the transmission mechanism used to power the cutterbar. In configurations that include a right angle drive (id est an L-type gearbox) for deriving power to the gearbox that mobilizes cutting sickle—and converts a circular motion to a linear alternating one—, it is used a shaft with universal joints at the ends as mean of ligation between the two gearboxes. Depending on the particular design, the input shaft of the sickle drive is positioned at a specific angle, and in order to cancel the non-uniformity of the rotational speed the output shaft of the L-type gearbox is placed in parallel to the first. However, when the cutterbar is requested to flex the sickle gearbox goes up and down therewith, and the angles of the universal joints vary. As a consequence, the needed torque for cutting the crop is much smaller than the claimed by the L-type gearbox. This indicates a severe power losses due to changing angles of the universal joints. Some manufacturers have included telescopic shafts to keep in the L-type gearbox input shaft parallel to the sickle drive input shaft, but it has resulted into premature failure of the Cardan transmission or into excessive robustness, expensive drive mechanisms for the cutterbar.

On the other side there are the constraints associated with traditional arrangements used to move the crop coming from the side sections to the open end of the main frame. Some well known use a transverse conveyor belt, which may be fixed to or floating relative to the cutterbar. This transverse draper covers the entire central section of the platform and determines a flat rigid surface that can vary its inclination relative to advance direction of the platform or the tilt with respect to the lateral draper conveyors, or both simultaneously. However, unlike the behavior related to the side draper conveyors, when the central portion of the cutterbar flexes to adapt to the natural curvature of field, the distance between the upper run of the transverse draper and said portion of the (bent) cutterbar is not constant. The latter happens because the cutterbar takes the form of a curve with multiple inflection points while the cross canvas defines a flat plane, so that the distance between the two geometries is not constant. This ended up into a dead zone defined between the front margin of the transverse conveyor and the corresponding portion of the cutterbar, that some manufacturers have intentionally called a rock trap, and is a region where the crop material flow is slowed down and where shelling occurs. Then, the approach to make the central portion of the cutterbar as flexible as possible tighten to the restriction of minimizing the dead zone resulted into a draper platform with central portion that is not so good at cutting crop height and no so good handling short, low volume crops.

DESCRIPTION OF THE DRAWINGS

FIG. 24 is a detail side view of a support arm isolated, like the ones illustrated in FIGS. 19-21, showing the range of angular positions it can adopt. The zoomed view on this figure shows the angular range the cranks can travel through.

DETAILED DESCRIPTION OF THE EMBODIMENT

Figure 1:
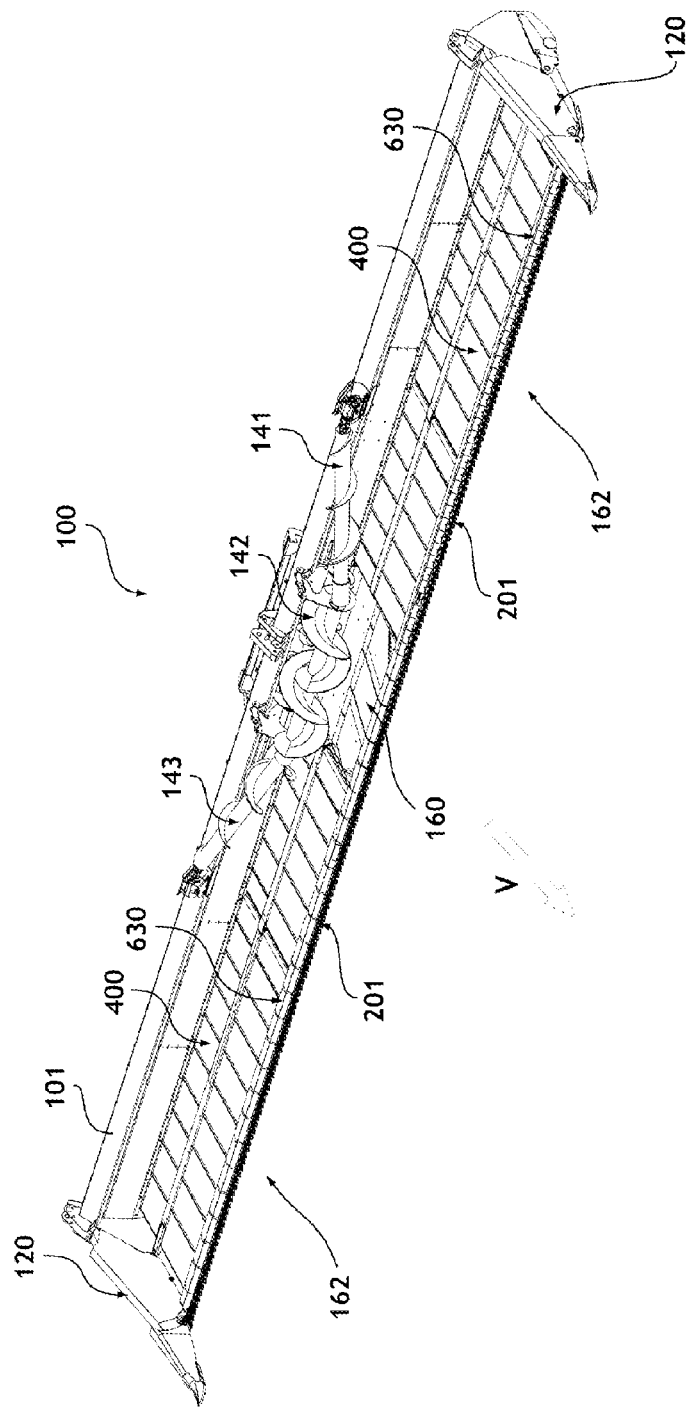
FIG. 1 is a top front perspective view illustrating a platform in accordance with the present invention.
Figure 2:
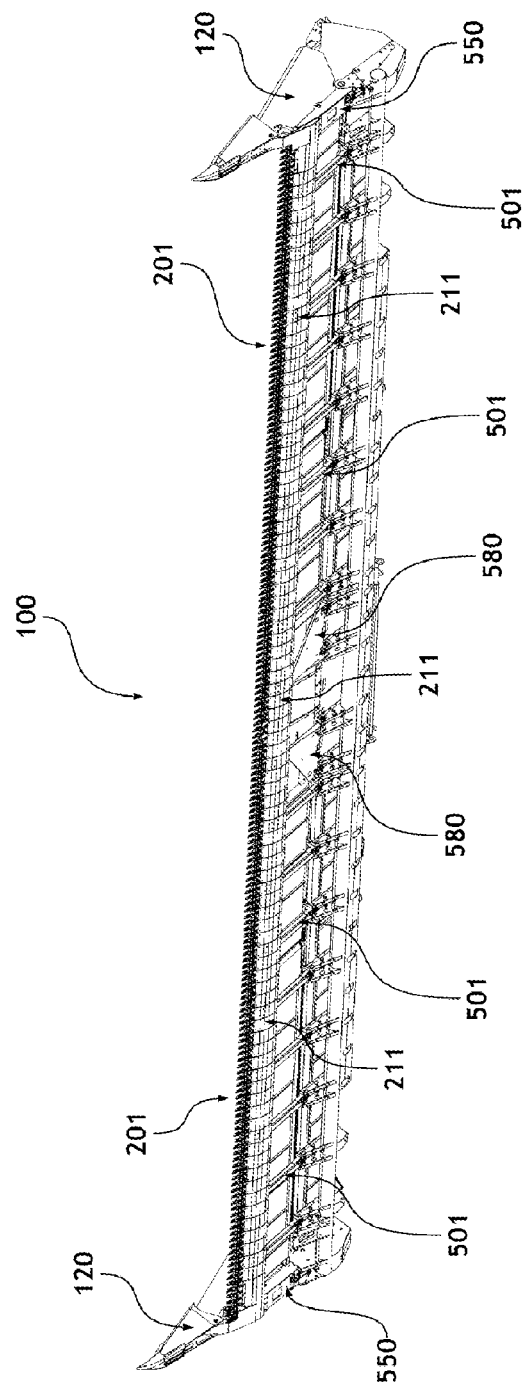
FIG. 2 is a bottom front perspective view of the platform shown in FIG. 1.
Figure 3:
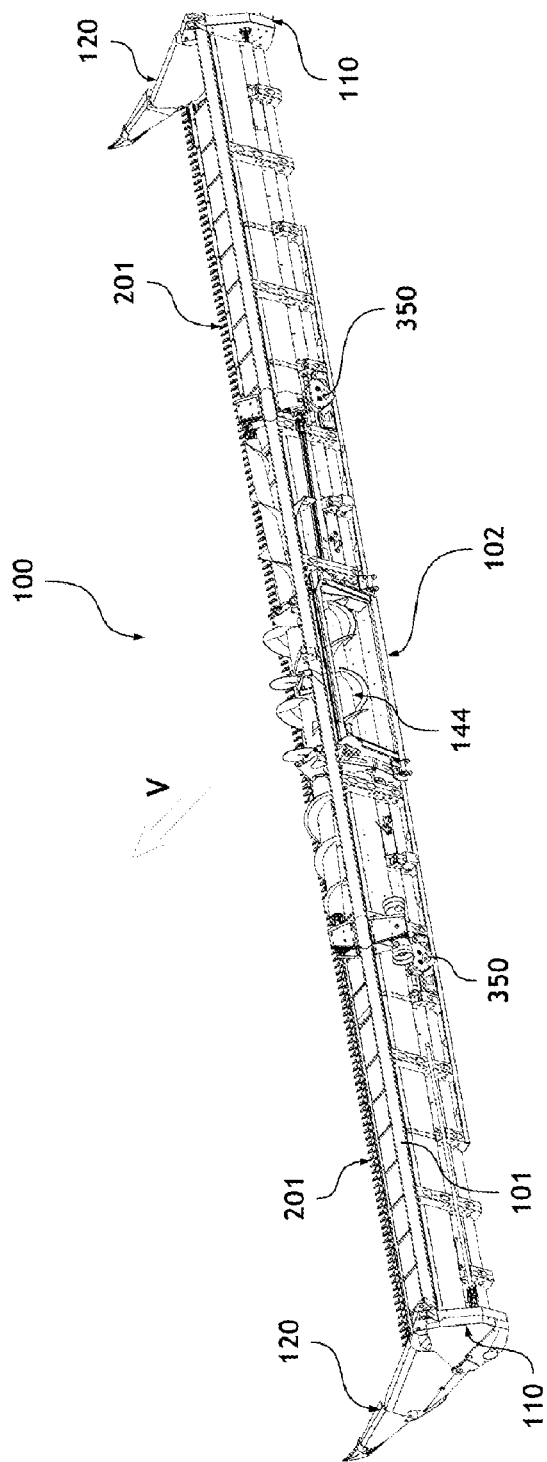
FIG. 3 is a top rear perspective view of the platform shown in FIG. 1.

Referring to FIGS. 1-3, the harvest header selected for illustration comprises a flexible platform 100 used in agricultural machines, preferably combine tractors. The platform 100 is configured to cut and harvest the crop while is advanced in a direction V generally forward so that the material is conveyed to an open end 102 and subsequently processed by other elements (not shown) of the combine tractor (not shown) to finally produce grains.

The platform 100 illustrated generally includes a main frame 101 comprising a central section 160 which projects forwardly from the open end 102, and at least two side sections 162 projecting laterally on either side of said central section 160. All the sections 160, 162 are bounded forwardly by the cutterbar assembly 201 and at the rearward by the main frame 101. Inside side sections 162 there is a set of composite-articulated support arms 501 responsible for a holding the cutterbar assembly 201 and responsible for sustain partially the set of belts of a draper conveyor 400. Draper conveyors 400 are responsible for transporting the cut crop from the side sections 162 to the center section 160. The outer lateral limits of the side sections 162 are each defined by a composite-articulated side arm 550, which is configured as the outermost point of support of the cutterbar assembly 201, and is responsible for carrying the transmission mechanism for driving said cutterbar 201. The portion of the cutterbar 201 which corresponds to the central section 160 is supported by at least one composite-articulated central arm 580, thus conferring to the platform 100 the property that its cutterbar assembly 201 is completely flexible, from end to end, from the outer side end of a side section 162 to the outer side end of the other side section 162. The platform 100 also contains a central auger assembly 140 comprising a right oblique auger 143, a left oblique auger 141, a front central auger 142 and a rear central auger 144; furthermore, contains a reel (not shown) extending laterally almost the full width of the platform 100 that operates to push inward standing crop platform 100. Both of the cutterbar assembly 201 and the draper conveyor 400 are preferably flexible so that the platform can work virtually 100 attached to the floor and adapt to the changing curved profile of the terrain when operated through the working direction V.

Figure 4:
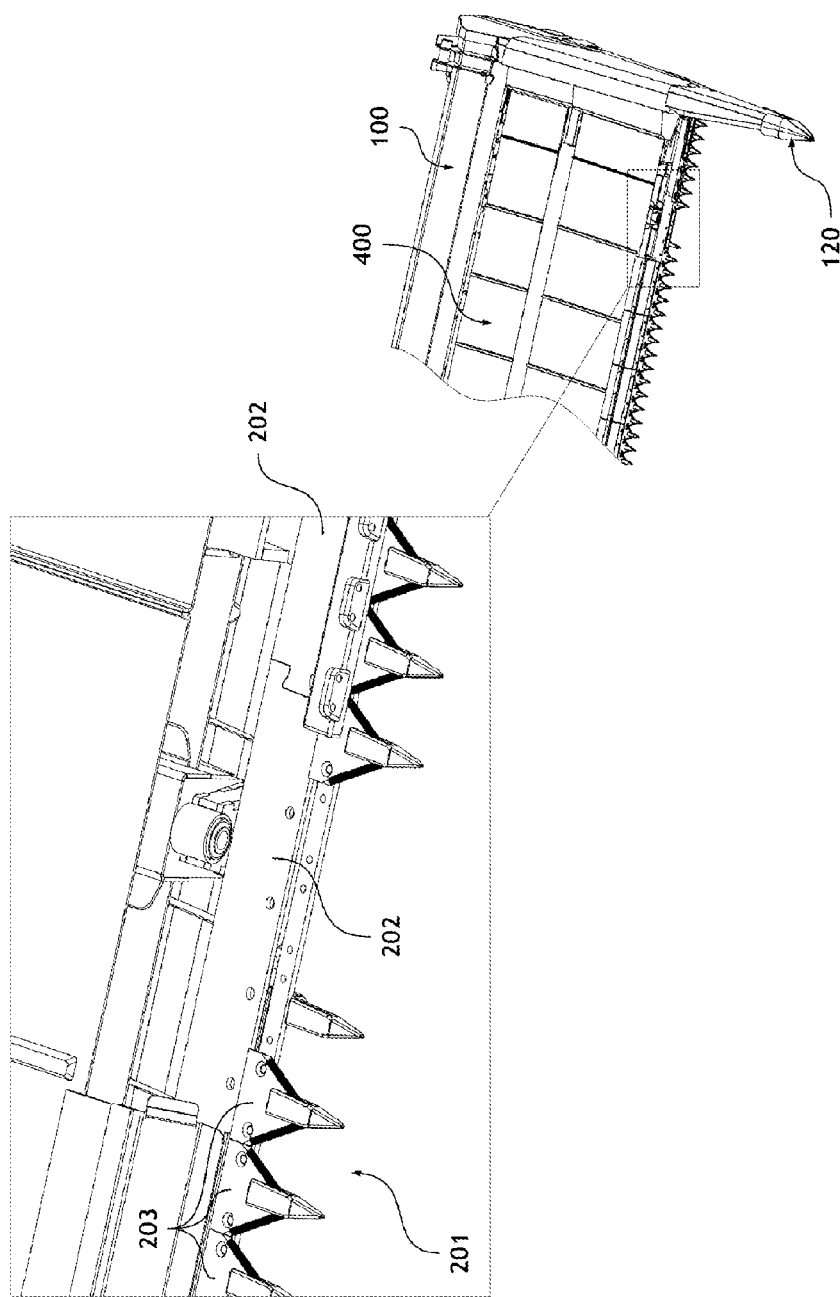
FIG. 4 is a front perspective view, where a portion of the platform illustrated in FIGS. 1-3 is enlarged for greater detail. In this constitution cutterbar assembly is displayed.
Figure 5:
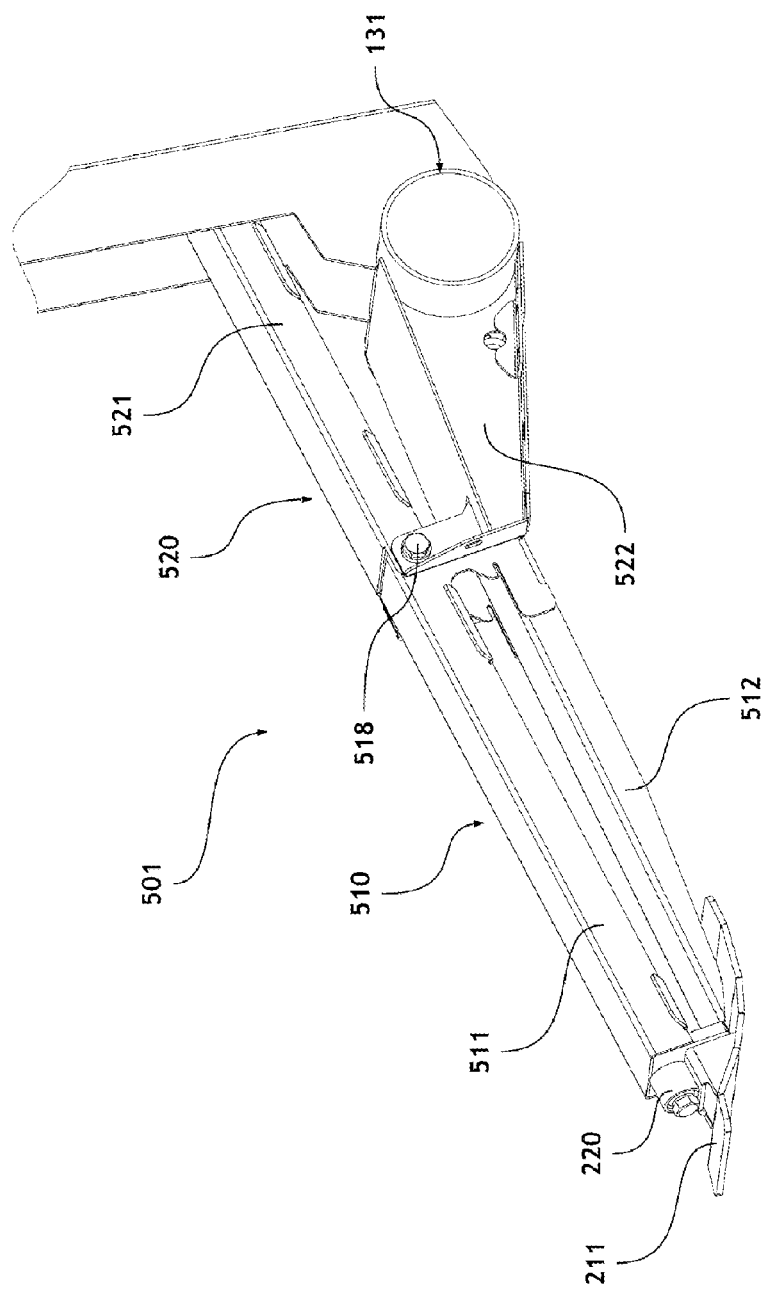
FIG. 5 is a top front perspective view of an isolated support arm from the platform shown in FIGS. 1-4.

Referring now to FIGS. 2 to 4, the platform 100 embodied for representing preferred aspects of the invention also has two wall frames 110 configured as the laterally outermost sections of the main frame 101. The cutterbar assembly 201 comprises in general a flexible bar 202, a plurality of friction plates 211 fastened to said flexible bar 202 and arranged laterally one beside the other, also comprises two outer friction plates 221 attached to the lateral ends of said side plate section 202, comprises at least one sickle bar assembly 203 containing a plurality of saws and configured to be actuated in a linear alternating motion to severe crop. Likewise, the platform 100 may comprise some other parts (not shown) whose inclusion does not affect spirit and scope of the invention as defined by the claims set forth hereinafter.

The platform 100 cited in the present invention is configured such that when advanced in the direction V, it erects and directs the crop with the reel (not shown) towards the draper conveyors 400 while cutting it via the cutterbar assembly 201. The cut crop falls onto the draper conveyor 400 and is carried to the central section 160 of the platform 100, where the set of augers 140 finally pushes it across the open end 102 to be subsequently treated by a threshing machine (not shown).

Composite-Articulated Cutterbar Support Arms

As shown in FIGS. 2 to 5, the plurality of composite-articulated belt support arms 501 are located in the side sections 162 and are attached to the secondary bottom beam 131 of the main frame 101. Each of these belt support arms 501 is constructed of a first section 520 and second section 510 rotary attached to the first. As evidenced in FIG. 6, these pivotal sections 510 are arranged to rotate around an imaginary axis 910 which intersects the side sections 162 of the platform 100, and divides them into front lateral sections 164 and rear lateral sections 166.

In a preferred embodiment of the present invention, each fixed portion 520 comprises a first upper support beam 521 and a second lower support beam 522, which together support the pivotal portion 510 of the corresponding articulated arm 501. Additionally, each pivoting section 510 is formed by an upper beam 511 and lower beam 512, which pivot together around the associated shaft 910. The pivotal sections 510 that are attached by the rear margin to corresponding fixed sections 520 by bolts 518, through which passes said pivot axis 910, and is attached by the front margin to a slip plate 211 by a bushing 220 which is made of an elastic material.

Figure 6:
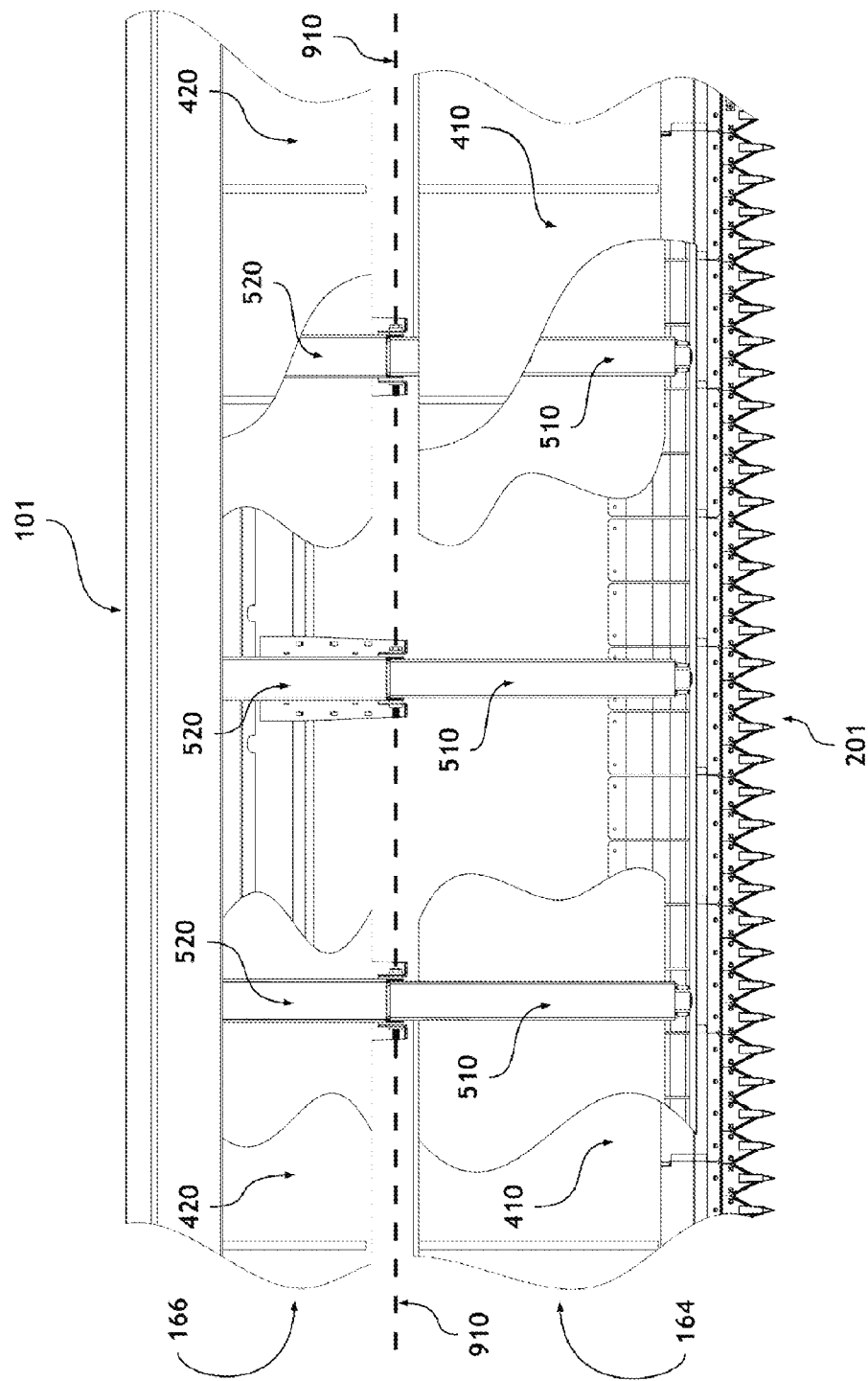
FIG. 6 is a top view of a fragment of the platform shown in FIGS. 1-3, where the draper belts were cut so that their position in relation to the support arms (like the one shown in FIG. 5) is discovered.
Figure 7:
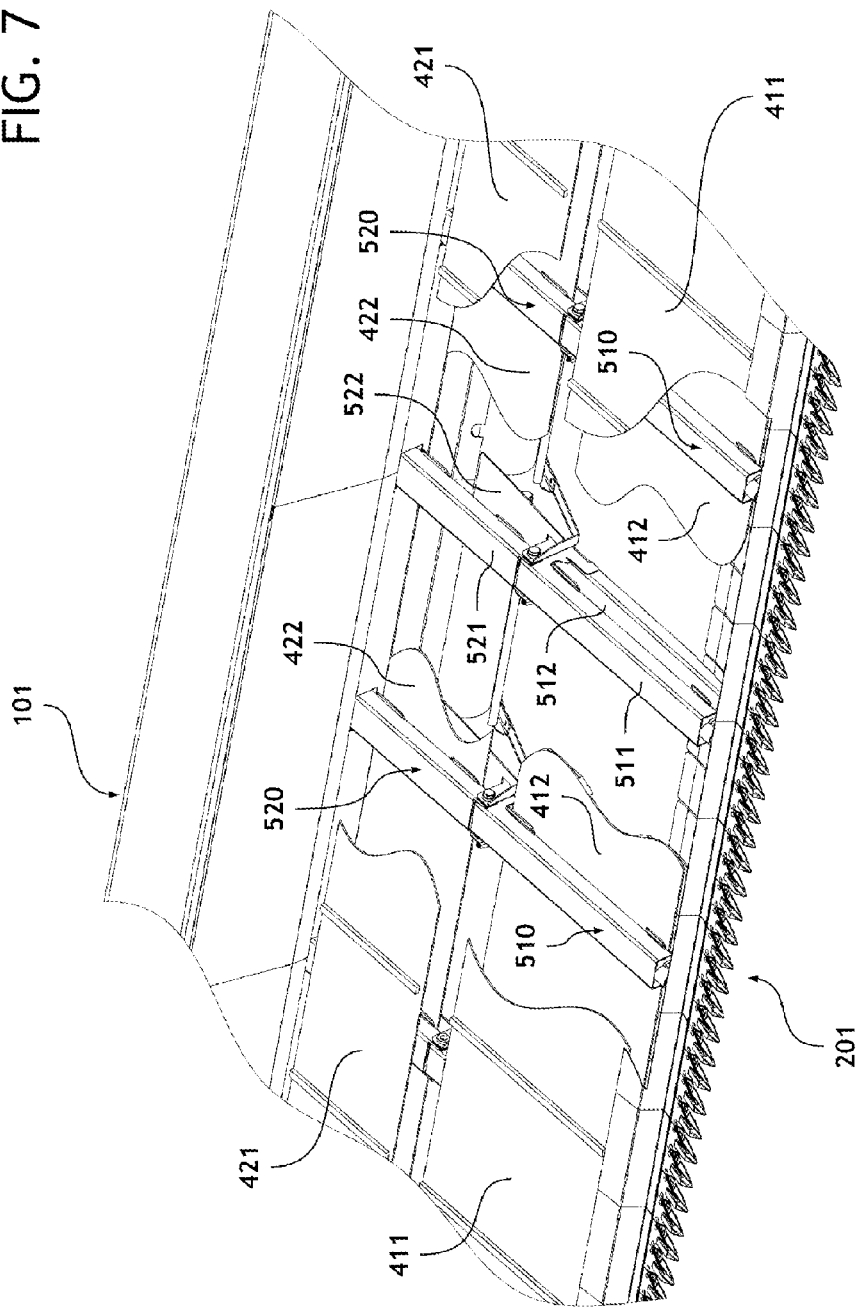
FIG. 7 is a top front perspective view of the portion shown in FIG. 6.

The draper conveyors 400 comprises at least one belt constructed to form an endless loop that circulates around two rollers. Each belt of the draper conveyor has an upper run over which the crop material is transported from the side section 162 towards the center section 160, and lower run circulating in the opposite direction closing the loop. In a favorite setting, each draper conveyor 400 is subdivided into a front draper conveyor 410, located on said front sections 164, and a rear draper conveyor 420, located in said rear sections 166. Front draper conveyors 410 are partially supported by the pivoting sections 510 of a set of belt support arms 501, while rear draper conveyors 420 are partially supported by the fixed sections 520 of a set of belt support arms 501 (FIG. 6). Furthermore, as shown in FIG. 7, the upper runs 411 of the front draper conveyors 410 are configured to slide over the first upper beams 511 and lower runs 412 are at least partially supported by the corresponding set of lower beams 512. Similarly, the upper runs 421 of the rear draper conveyor 420 are configured to slide over the first upper beams 521 of the arms 501 and lower runs 422 are at least partially supported by the corresponding lower beams 522.

The pivotal portions 510 of belt support arms 501 enable the front draper conveyor 410 to undergo a vertical compensation motion when the platform 100 is guided over the ground in the harvesting operation. Also, the width of belt support arms 501 is increased to allow a better of contact with the draper conveyor 400. This way, neither the upper runs 411, 421 nor the lower runs 412, 422 is able to bend. It is important to notice that additional belt support arms 501 could be added to improve the supporting capability without interfering with the scope of the present invention.

Figure 8:
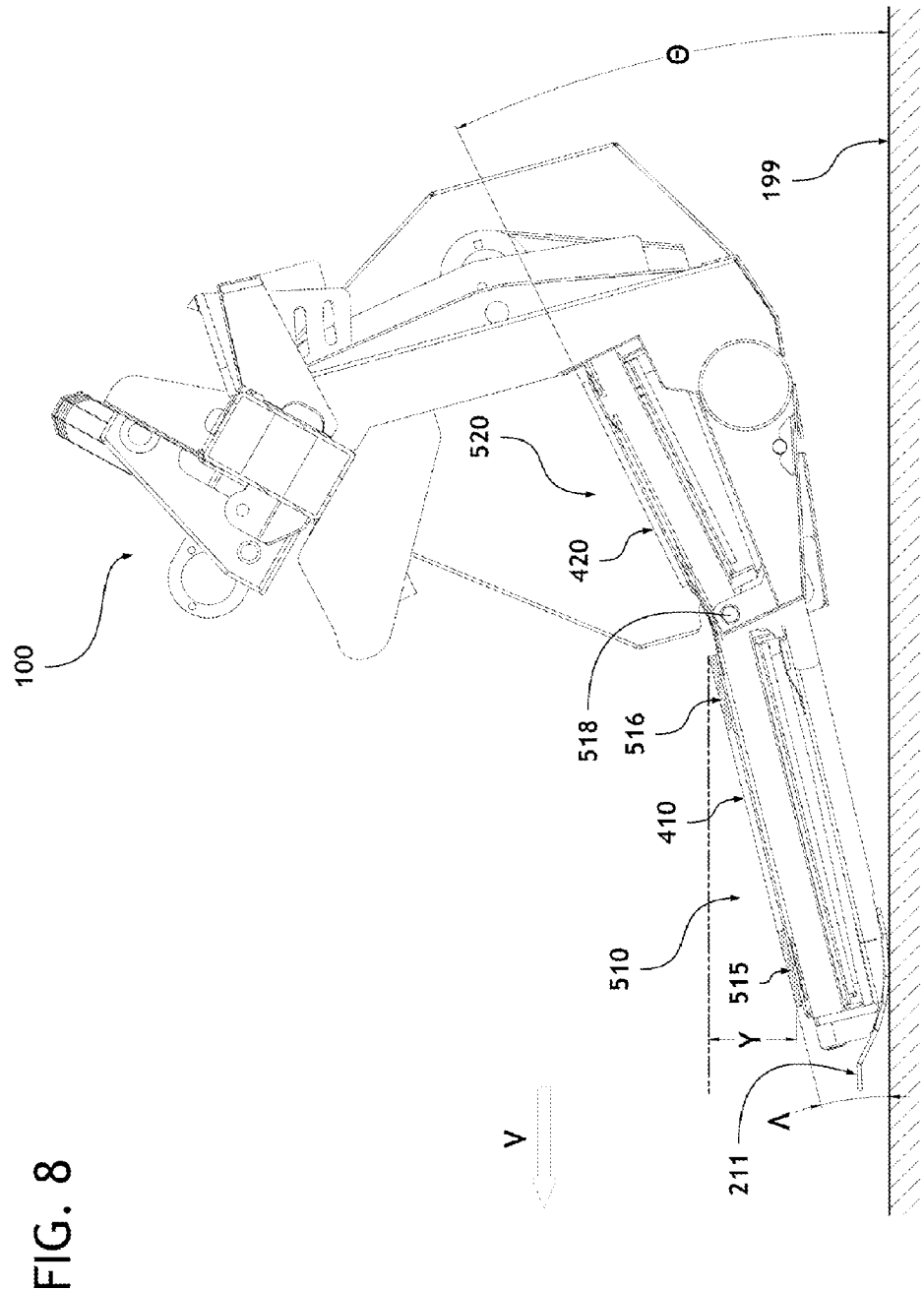
FIG. 8 is a sectional side view of the platform shown FIGS. 1-3, where it is shown the composed configuration of the support arms with the angles that it has with the ground.

As can be understood from FIGS. 7 and 8, when the platform 100 is advanced in a working position in a direction V with sliding plates 211 supported on the ground 199, changes in the curvature of the latter force the cutterbar assembly 201 to flex therewith, and as each belt support arm 501 is joint to a sliding plate 211 it is consequently urged to make a pivotal movement. While the pivotal portions 510 of belt support arms 501 make the front margin 515 of the front draper conveyor 410 to adapt the contour to the ground 199, the profile of rear draper conveyor 420—as it is supported by fixed elements, the fixed sections 520 of the support arms 501—remains invariant with respect to changes in the profile of the front draper conveyor 410.

The mechanism described in the preceding paragraph is characterized in that the platform 100 may rest and slide on the floor 199 such that the angle Λ of the front draper conveyor 410 with the ground 199 is different to the angle θ of the rear draper conveyor 420 with the ground 199. Platforms using prior art mechanisms have only one draper convertor and therefore achieve a single angle to attack the crop. This angle generally defines an attack front Y—call attack front Y to the vertical distance between the front margin 515 and the rear margin 516 of the front draper conveyor 410, as exemplified in FIG. 8—, so those grains that have been shed from the plant while material is carried on the canvas have a larger potential to fall to the ground, and thus missed from being exploited. With the herein described system the angle A is small and thus a negligible height of the attack front Y is achieved, because the platform 100 as a whole is able to work closer to the ground.

As commented above, belt support arms 501 cooperatively supports the cutterbar assembly 201. The plurality of slip plates 211 connected to the flexible bar 202 allows to map the set of articulated arms 501 with the cutterbar assembly 201. Because sometimes the plates 211 are arranged to work supported on the floor 199 whenever the curvature of the latter changes the skid plates 211 will be required to describe a substantially vertical movement, which transmitted to the arms 501 as a pivotal movement of the corresponding pivot sections 510. The flexible plate section 202—and therefore the cutterbar assembly 201—behave to fit the curvature and finally get a crop cutting height that is essentially invariant over the width of the platform 100. Furthermore, the resilient material of the bushing 220 absorbs the movements that tend to misalign the articulated arm 501 relative to the corresponding slip plate 211 when the first describes upward or downward movements.

Figure 9:
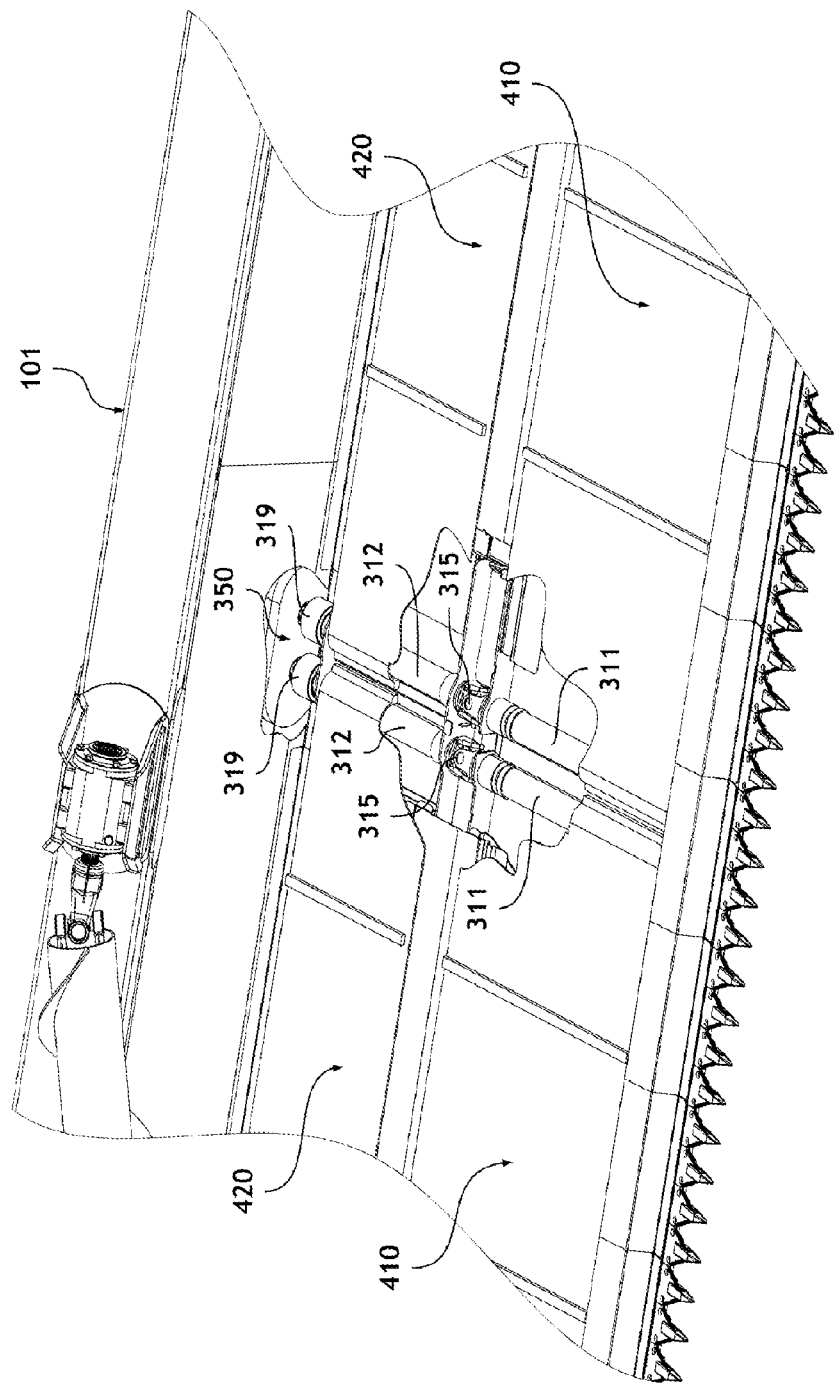
FIG. 9 is a top front perspective view of a fragment of the platform shown in FIGS. 1-3, where the draper belts were cut so that the drive rollers of the draper conveyors are discovered.

Driver rollers 310 for draper conveyor 400 are shown in FIG. 9. In a preferred embodiment, each one is composed of a first fixed section 312, responsible for powering the rear draper conveyor 420, and a second pivoting section 311, which accelerates the corresponding front draper conveyor 410. A gear mechanism 350 is responsible for providing power the driver rollers 310. Such energy comes from a motor (not shown), that could be hydraulic, electrical or mechanical, coupled thereto. The figure illustrates an elastic material coupler 319 preferably as means for attaching the rollers 310 to the gearbox 350. It is obvious that this element 319 can be eliminated for some lower load applications applications. On each roller 310, the fixed section 312 is rotary joint with pivoting section 311 using a universal joint 315. This universal joint 315 is set so that its pivot point is located to be intercepted by the imaginary axis 910, about which the belt support arms 501 rotate. Thus, the rotary movement of the pivoting sections 510 adjacent to the driver rollers 310 does not generate undesirable forces on the union 315.

Figure 10:
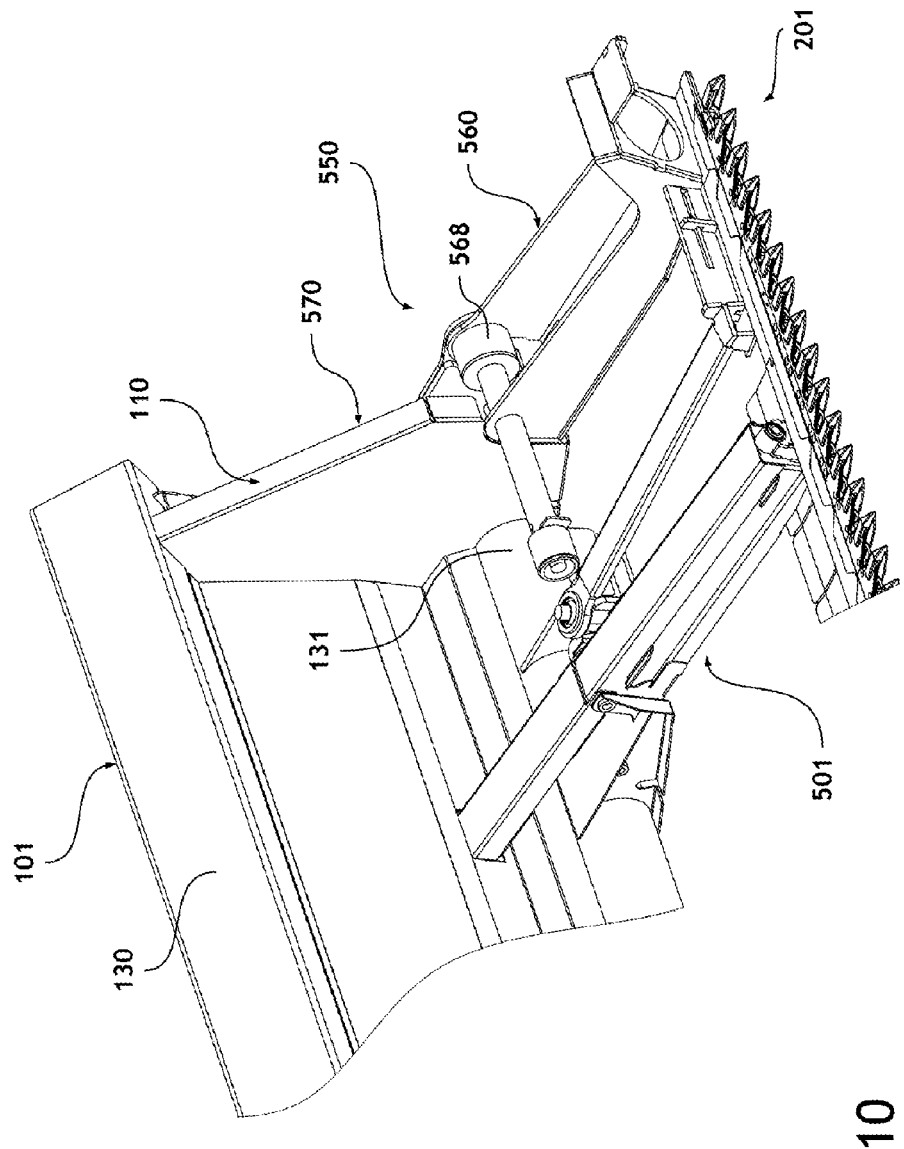
FIG. 10 is a top front perspective view of a lateral support arm isolated, illustrated in conjunction with the adjacent support arm in accordance with the platform shown in FIGS. 1-3.

Referring now to FIG. 10, it is shown the location of the lateral outermost support arms 550 for the cutterbar 201. Each side section 162 has on its outermost lateral side (referred from the central section 160) a final support arm that is a lateral outermost support arms 550. Moreover, the main frame 101 of the platform, which is configured to extend laterally toward both sides of the open end 102, ends with two perpendicular sheet metal walls or end frames 110. Said end frames 110 are connected to the main frame 101 through primary upper beam 130 and through secondary lower beam 131. Then, each lateral outermost support arm 550 is located outwards the corresponding end frame 110. As it will be discussed later, the wall frames 110 constitute part of the lateral bounding for the side sections 162.

FIGS. 10 to 13 complements the understanding of the constructional details of the outermost support arm 550. While the outermost support arm 550 could be built similar to the belt support arm 501, in a desired configuration of the present invention this side arm 550 is made of a single body. Each outermost support arm 550 is mounted using a rotary joint 568 configured to pivot around an imaginary axis 915. Each outermost support arm 550 has a first member 560 projecting forward from the rotary joint 568 and a second member 570 projecting rearward from the rotary joint 568. The front ends of the each first member 560 are attached to each one of the side end of cutterbar assembly 201. The bottom side of the front ends of each first member 560 has an L-shaped skid plate 221 that allow the outermost support arms 550 to also work sliding over the ground. Thus, whenever the unevenness on the floor pushes the skid plate 221, the outermost support arm 550 is biased to rotate and thus the end of the cutterbar 201 describes an upward or downward movement. It is to be noted that the present invention also encompasses those configurations where the construction of the lateral support arm 550 is carried out so that it rotational axis 911 is coincident with the rotational axis 910 of the belt support arm 501.

Figure 11:
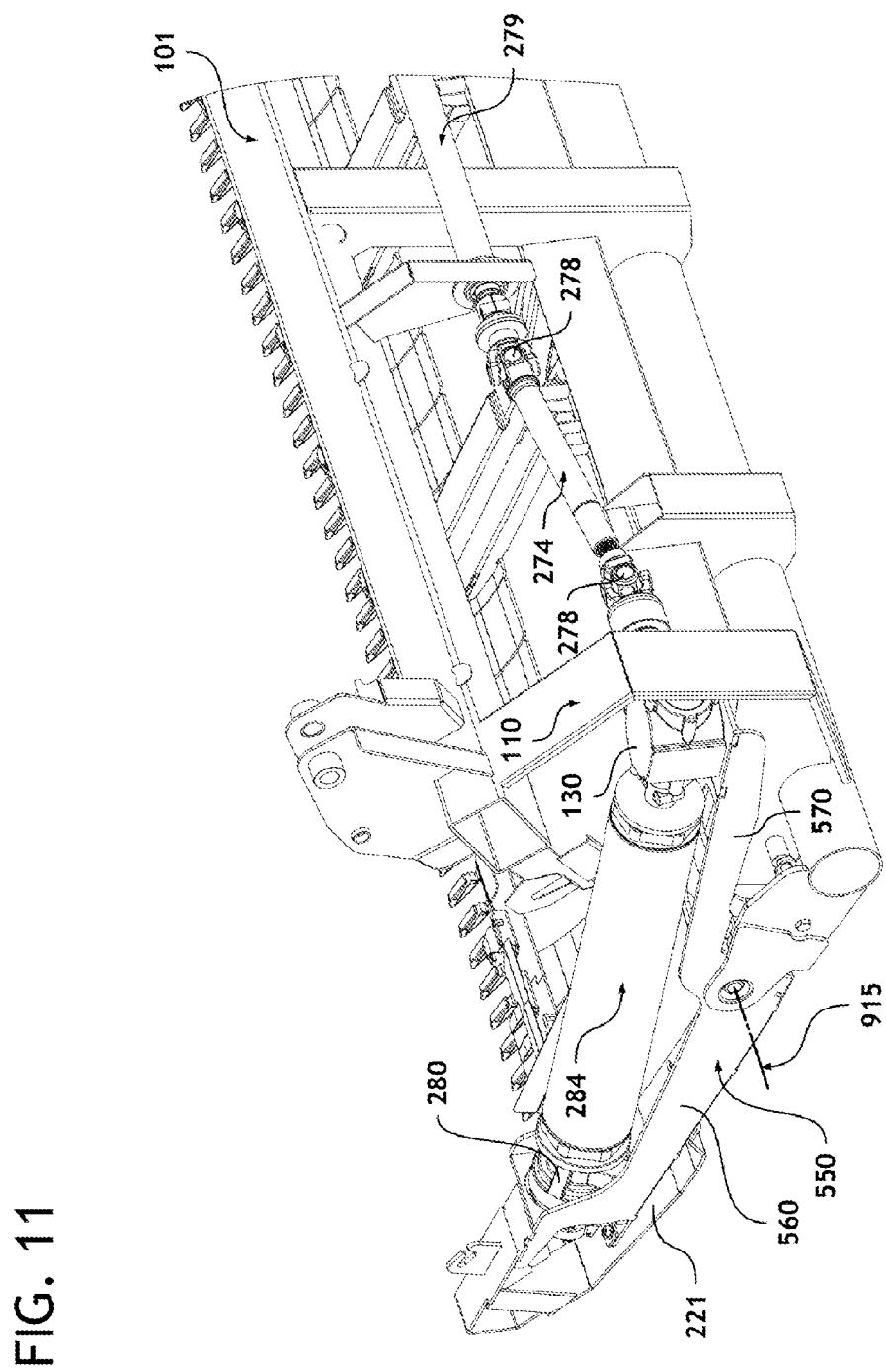
FIG. 11 is a top rear perspective view of a lateral support arm, in accordance with the platform shown in FIGS. 1-3. This picture shows the constituent parts of the drive transmission for the cutterbar drive gearbox.
Figure 12:
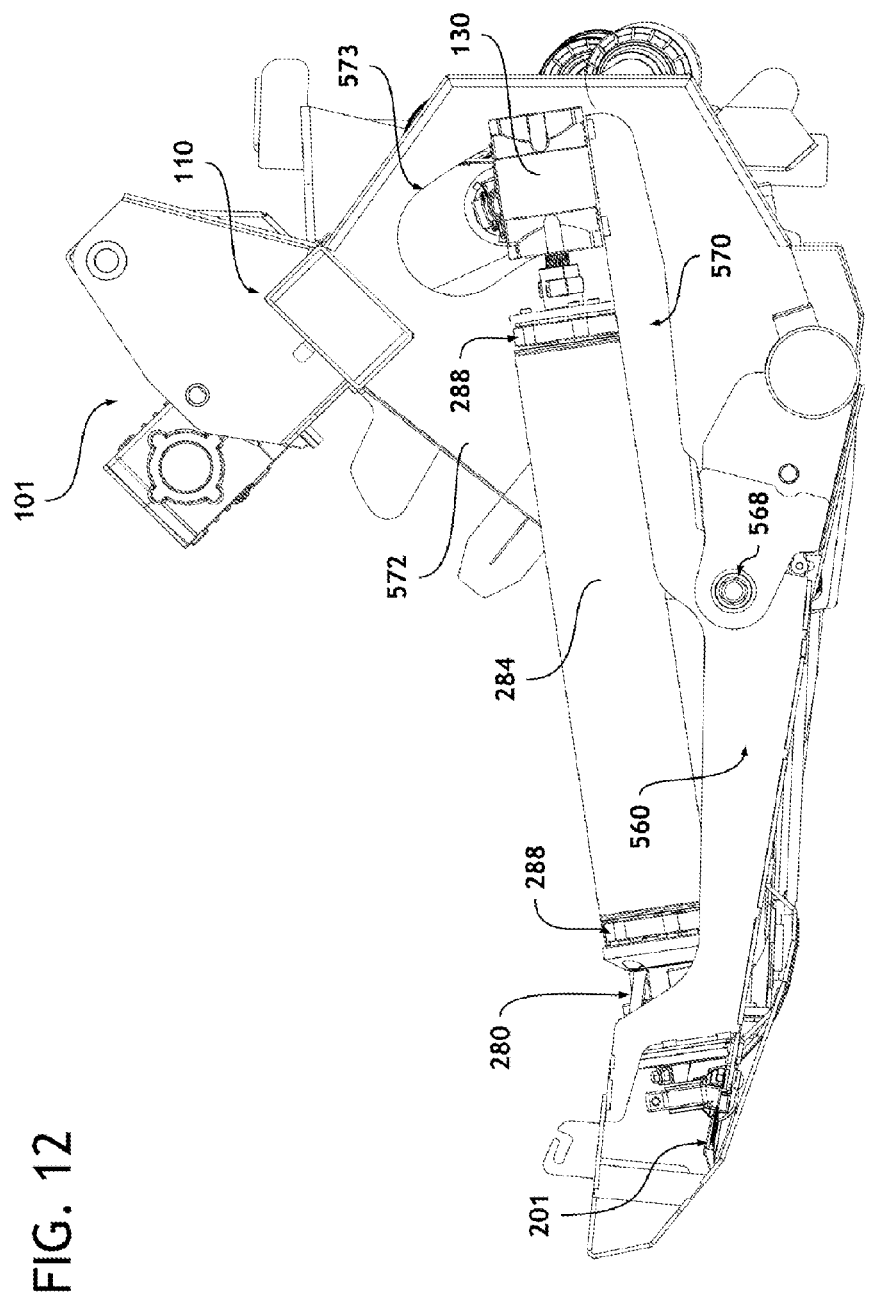
FIG. 12 is a side view of the lateral support arm shown in FIG. 11. It is illustrated a particular configuration where elastic members where included in the cutterbar drive transmission.
Figure 13:
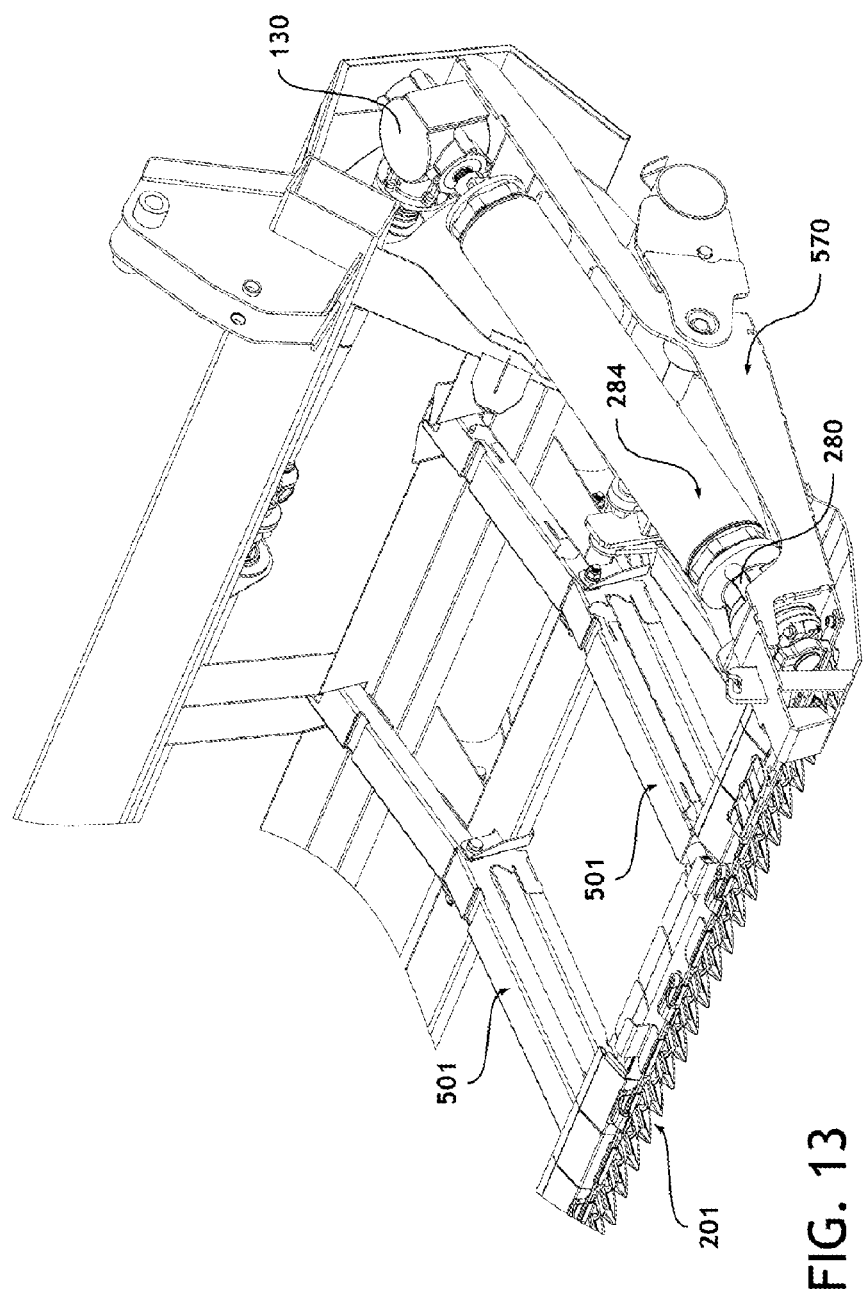
FIG. 13 is a top front perspective view of a lateral support arm shown in FIG. 11. This picture complements the understanding of how the lateral support arms work in relation to the belt support arms (showed in FIGS. 5-7)

With reference to FIGS. 11 to 13, the sickle drive gearbox 280 that powers the sickle assembly 203 is disposed on the front end of the first member 560 of an outermost support arm 550. The sickle drive 280 converts circular motion in a linear reciprocating movement. The power source that drives said sickle drive 280 is derived from the combine tractor (not shown) to which the platform 100 is attached to. Power travels through a back drive shaft 279 at the rear of the main frame 101 to a region close to an end frame 110 (side end of the main frame). A telescopic shaft 274 links the back drive shaft 279 to an L-type gearbox 130. This L-type gearbox 130 is preferably supported on the rear end of the second member 570 of an outermost support arm 550. The end frames 110 comprise an open window 573 that is built to allow the back transmission 279 to come across the input shaft of the L-type gearbox 130. Moreover, this open windows is configured to also allow the swinging movement of the telescopic shaft 274 produced when the corresponding outermost support arm 550 is requested to rotate around its axis 915.

The sickle drive 280 alternating load is damp down by a flywheel 284 that acts as an energy reserve to mitigate the loss of movement when load variations appear. This flywheel 284 is intentionally constructed as a cylinder that extends from the L-type gearbox 130 to the sickle drive 280, so that the flywheel 284 act both as an inertial mass and as a linking shaft. Due to the achieved size of the flywheel 284, the mechanism is able to gain a high inertial state to control vibrations caused by the alternating loads of the sickle drive 280. It is important to notice that when the outermost support arm 550 rotates, both the sickle drive 280 and the L-type gearbox 130 pivot around the same axis 915, and the flywheel 284 then is requested to twist accordingly. The telescopic shaft 274 is built with universal joints 278 on both ends phased to cancel the changing angular velocity that happens when the L-type gearbox 130 moves upwards or downwards.

Another preferred aspect of the present invention is the existence of an elastic material joint 288 located precisely between the L-type gearbox 130 output shaft and the flywheel 284, which is used to increase response to vibrations of the mechanical drive when the load on the box blades 280 varies sharply and thereby increase the life of the components. FIG. 12 shows a second elastic material joint 288 placed between the flywheel 284 and the input shaft of the sickle drive 280; this was added after it was proven to reduce even more the vibrations to the mechanism. It must be noticed that including one, the other or both elastic material joints 288 are configurations claimed by the scope of the present invention.

Figure 14:
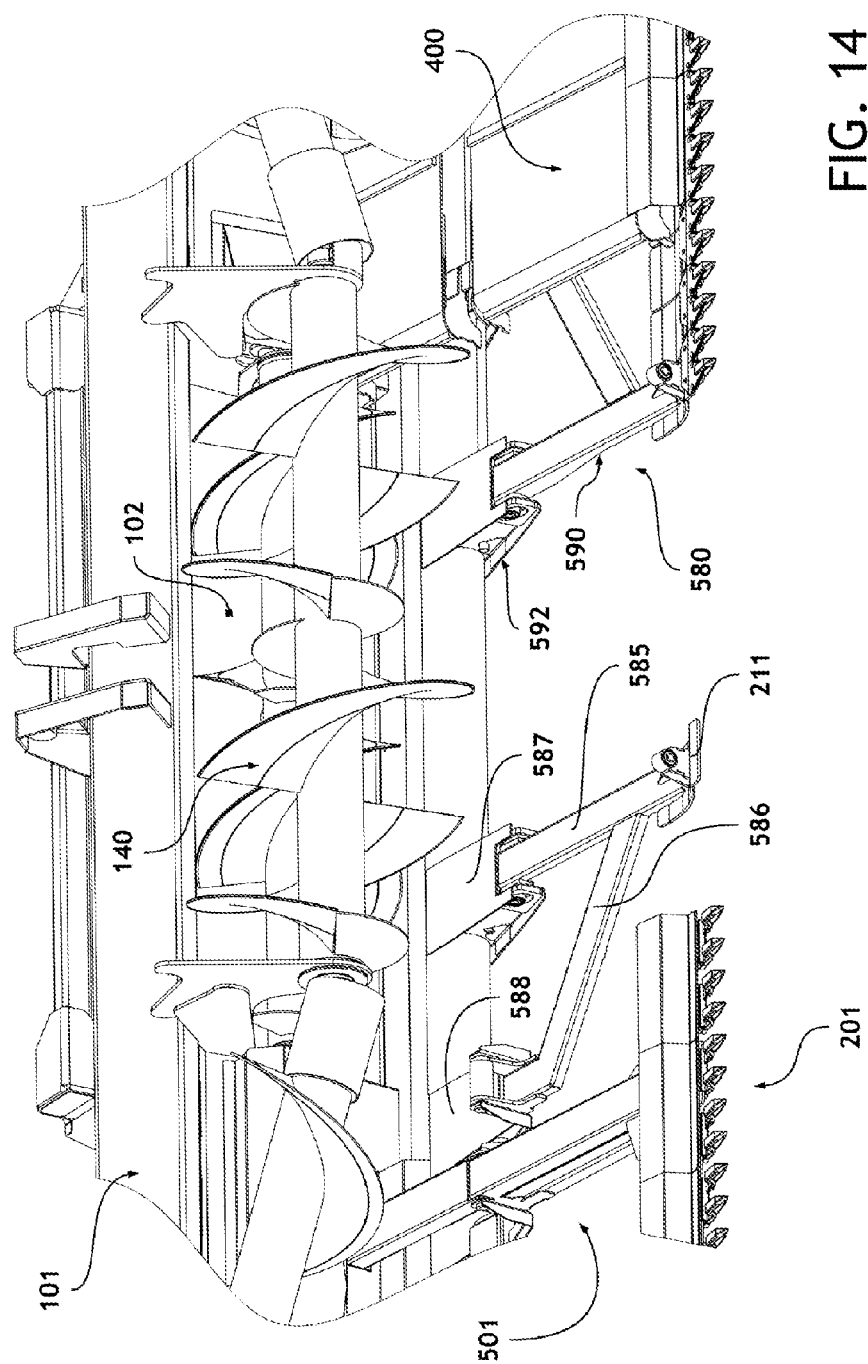
FIG. 14 is a top front perspective view of a fragment of the platform shown in FIGS. 1-3, where the central section of the platform is shown in conjunction with its constituent elements. It is displayed the components of central support arms and their relationship to the surrounding elements.
Figure 15:
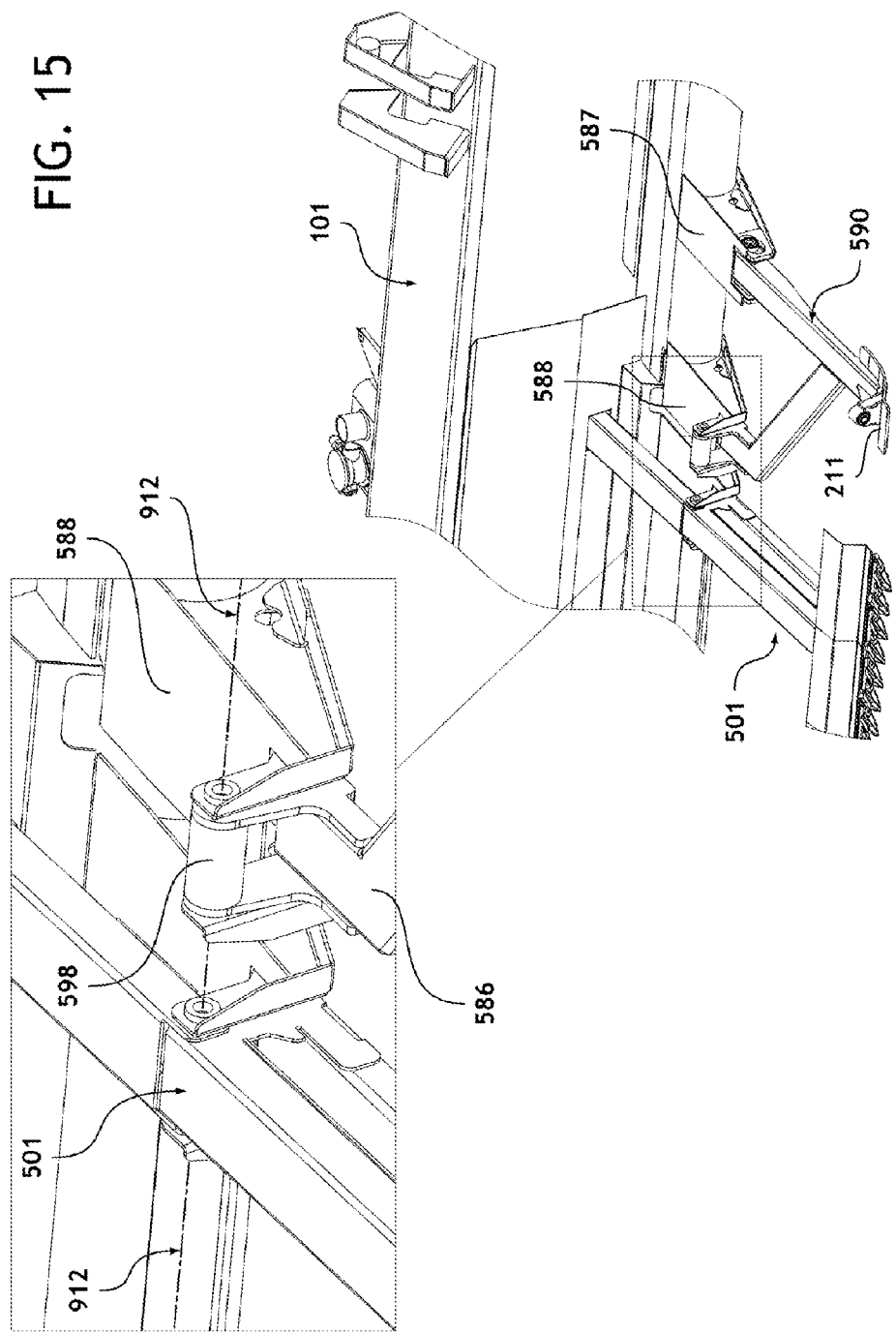
FIG. 15 is a front perspective detail view illustrating the construction of the central support arms. It can be seen the pivot axis of the central arms and the relation of this axis with the pivot axis about which the other support arms rotate.
Figure 16:
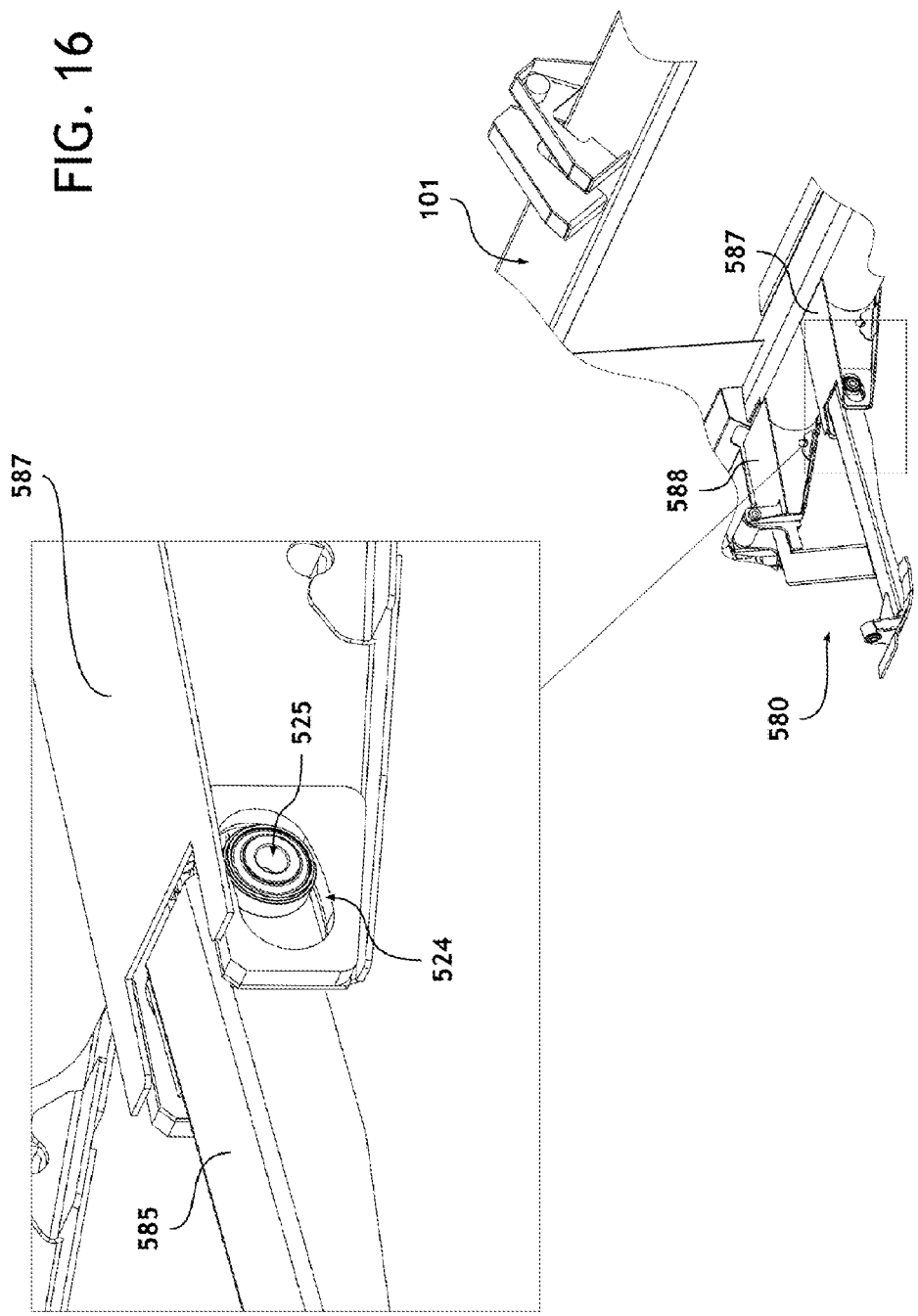
FIG. 16 is a side perspective detail view of a central support arm like shown in FIG. 15. This picture demos the track or rail over which the central support arms is sliding supported.
Figure 17:
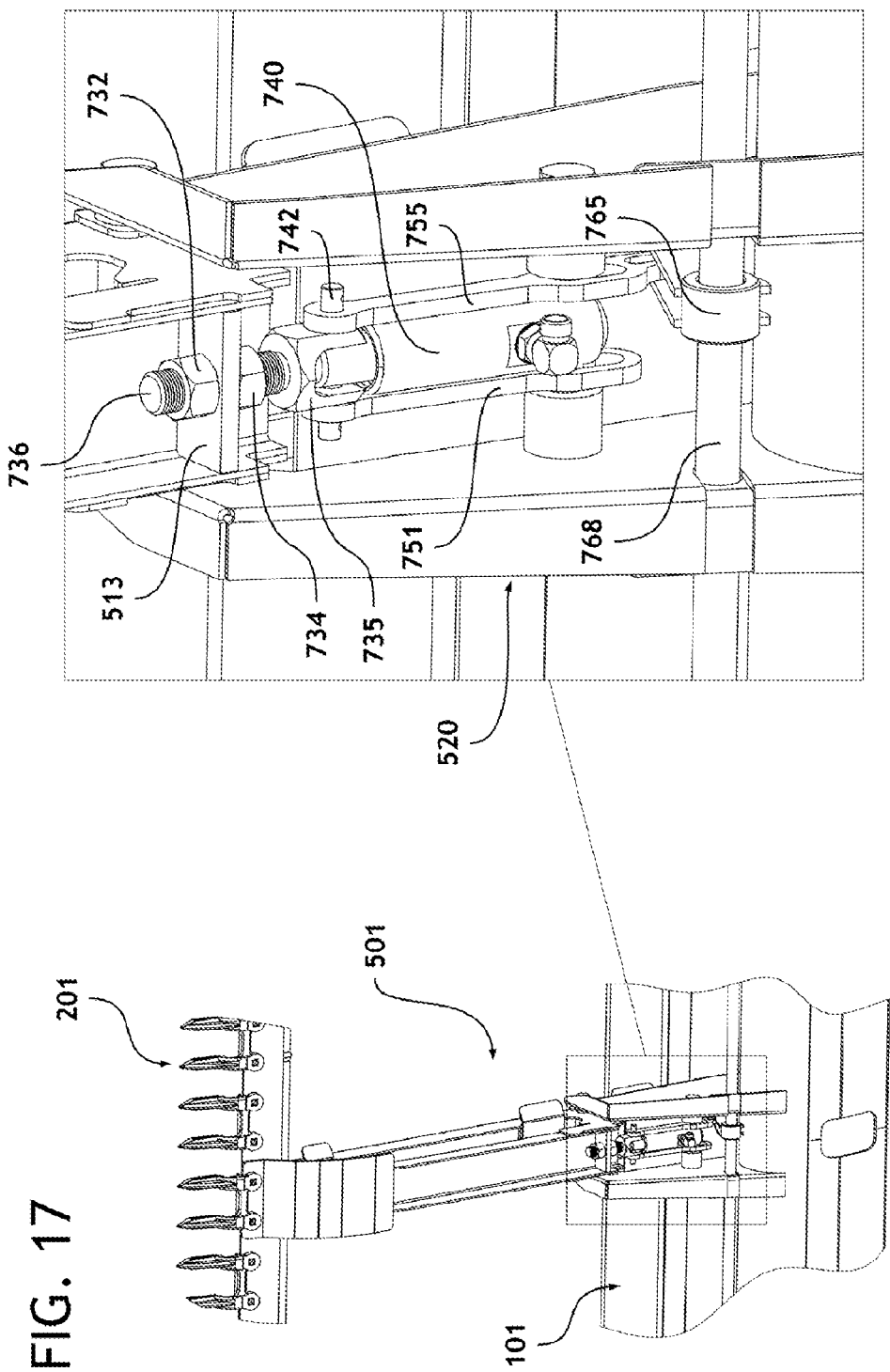
FIG. 17 is a bottom perspective detail view of the isolated support arm shown in FIG. 5. The configuration of the drive mechanism of the support arms is displayed, with the stop structure and the height sensor system.

FIGS. 14 to 16 illustrates a special type of support arms employed to support the cutterbar 201 at the central section 160. The open end 102 preferably located in center of the main frame 101 is configured to allow the transfer of the cut crop material towards the combine tractor (not shown) that produce the grains. A set of central augers 140 is responsible for directing the material coming from the draper conveyors 400 across said open end 102. The portion of the cutterbar assembly 201 which corresponds to the central section 160 is supported by a pair (could be only one, or more than two) of central support arms 580. Each of these central support arms 580 is constructed of a first section 592 and second section 590 rotary attached to the first. The front margin of the second section 590 is also joint to a slip plate 211 by a bushing 220 made of an elastic material.

In the preferred embodied example, the pivotal sections 590 are arranged to rotate around an imaginary axis 912 which intersects the central section 160. The first section 592 of central support arm 580 comprises a first support 587 and a second support 588, and the pivotal sections 590 comprises a first straight beam 585 and a second oblique beam 586. While the second oblique beam 586 pivots around axis 912 via the hinge 598 comprised by the first support 585, the straight beam 585 is, on the other hand, supported for sliding by its rear end on a kind of track or rail 524 comprised in the second support 587 (FIGS. 15 and 16). Thus, the hinge 598 with track 524 together support the cantilever loads on the pivot section 590. Furthermore, the connection between the straight beam 585 to the corresponding second support 587 could be achieved by means of a bearing 525 to roll on the track 524, for reducing the frictional resistance to movement (FIG. 16).

Finally, due to the combined use of the belt support arms 501, the outermost support arms 550 and the central support arms 580 the cutterbar assembly 201 is able to be configured flexible across the entire width of the platform 100.

Flotation System for the Cutterbar Support Arms

FIGS. 17-24 show how the floatation system for the cutterbar is installed over the support arms 501, 550, 580. Each of the aforementioned support arms 501, 550, 580 contain at least one hydraulic cylinder 740. The cylinder 740 is configured attached by its piston rod to a commanding fork 730 through a bolt 742, and is connected at its base to the fixed member 520, 570, 592 (of the corresponding support arm 501, 550, 580) through a bolt 744. Each commanding fork 730 is attached to the pivoting member 510, 560, 590 (of the corresponding support arm 501, 550, 580). In a preferred configuration these forks 730 comprise a first threaded body 736, and each of said pivot portions 510, 560, 590 comprise at the rear end a plate 513 with a hole. The threaded body 736 pass across the hole of said plate 513 and allows the commanding fork 730 to be fastened also to the rear end of said pivot portions 510, 560, 590. Then, the fork 730 is adjusted (secured) with a nut 732 and lock nut 734 against said plate 513. The commanding forks 730 also comprise a second fork-shaped section 735 to clasp the piston rod of the corresponding hydraulic cylinder 740.

Figure 18:
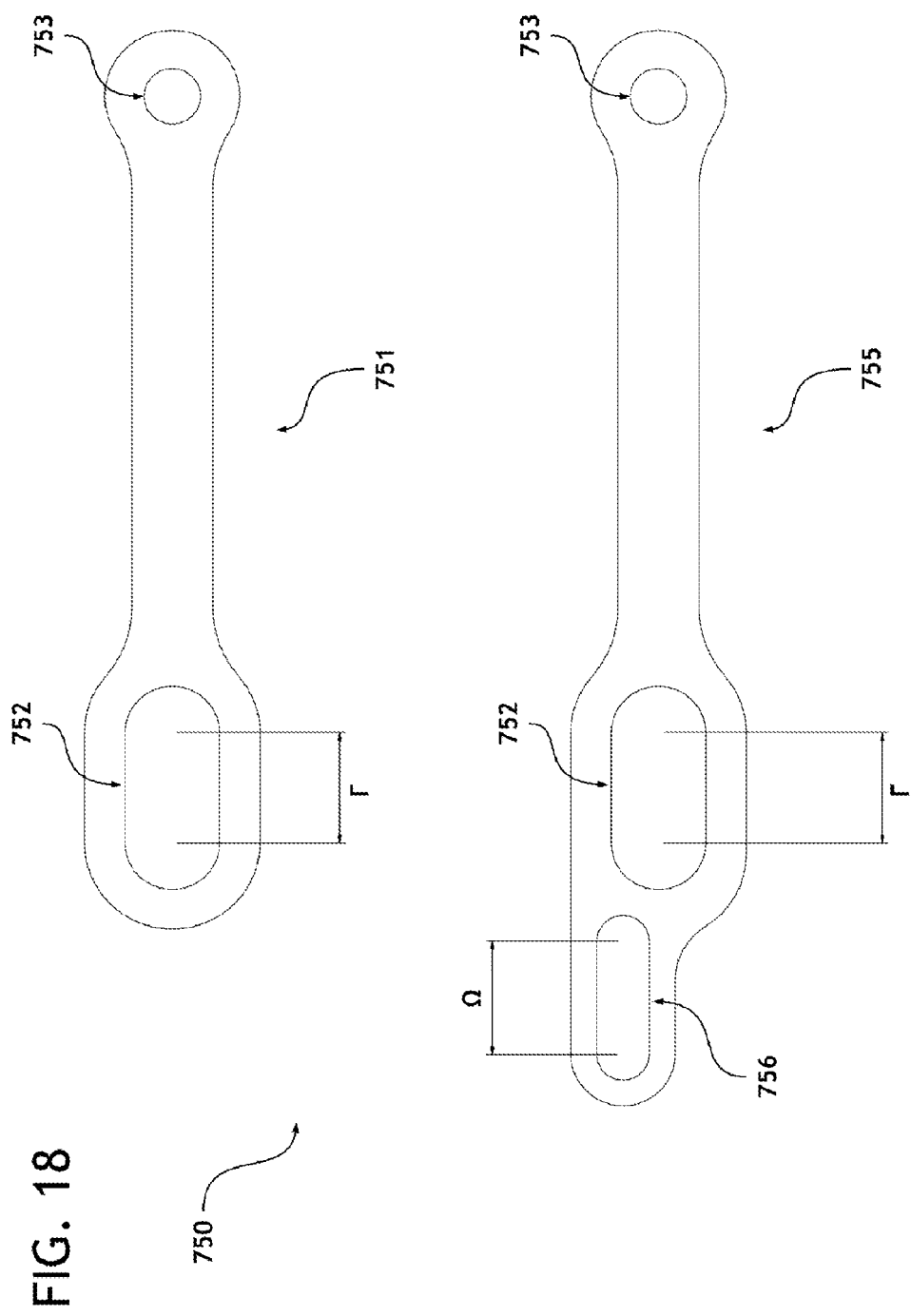
FIG. 18 is a side view of the parts that make up the stop structure used in the support arm as showed in FIG. 5.
Figure 19:
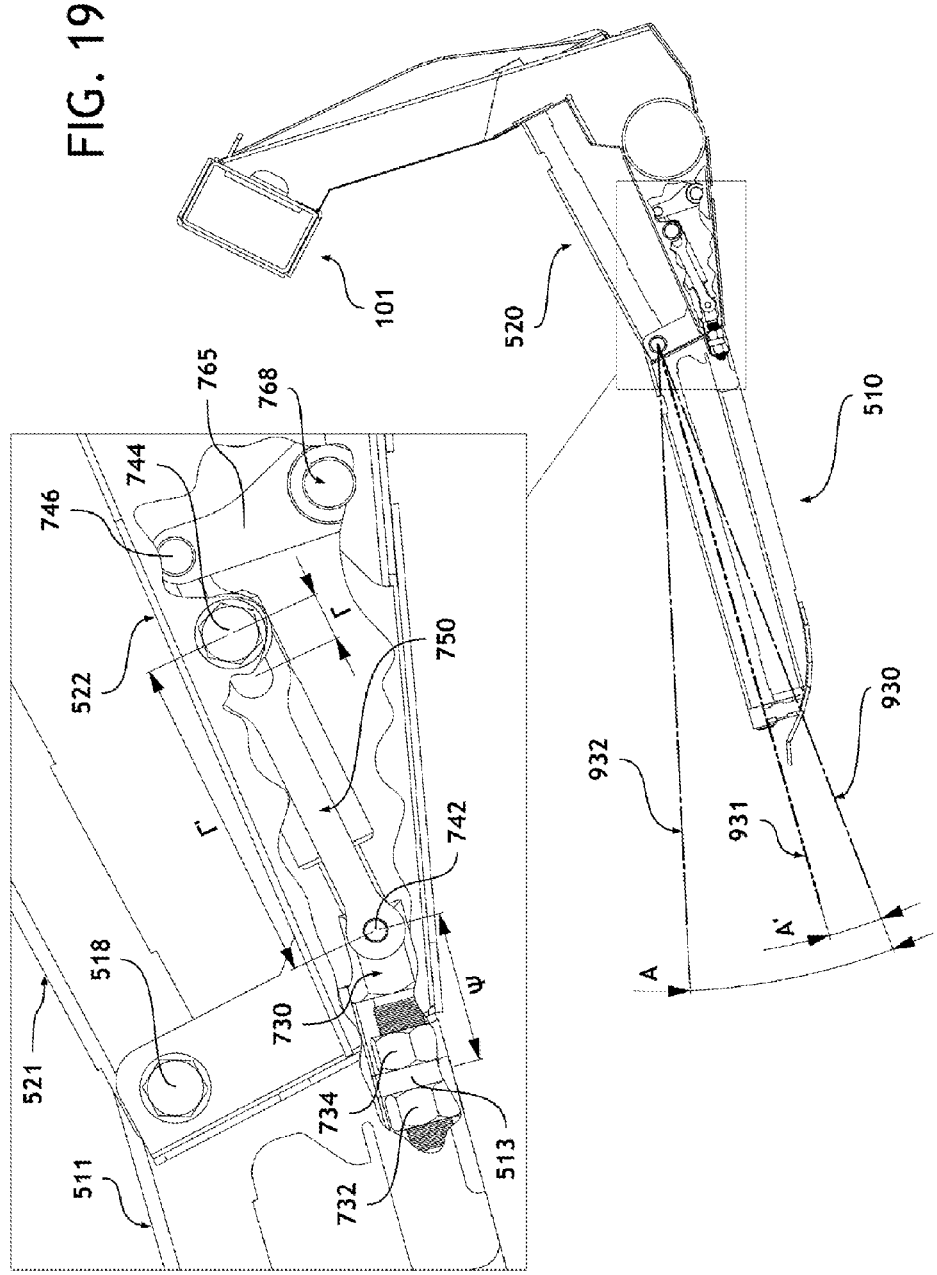
FIG. 19 is a detail side view of a belt support arm isolated as illustrated in FIGS. 5-7, showing the range of angular positions it can adopt. A detail a cut is exhibited that reveals the constituent parts of the drive mechanism and the relationship of this with the position of said arm.
Figure 20:
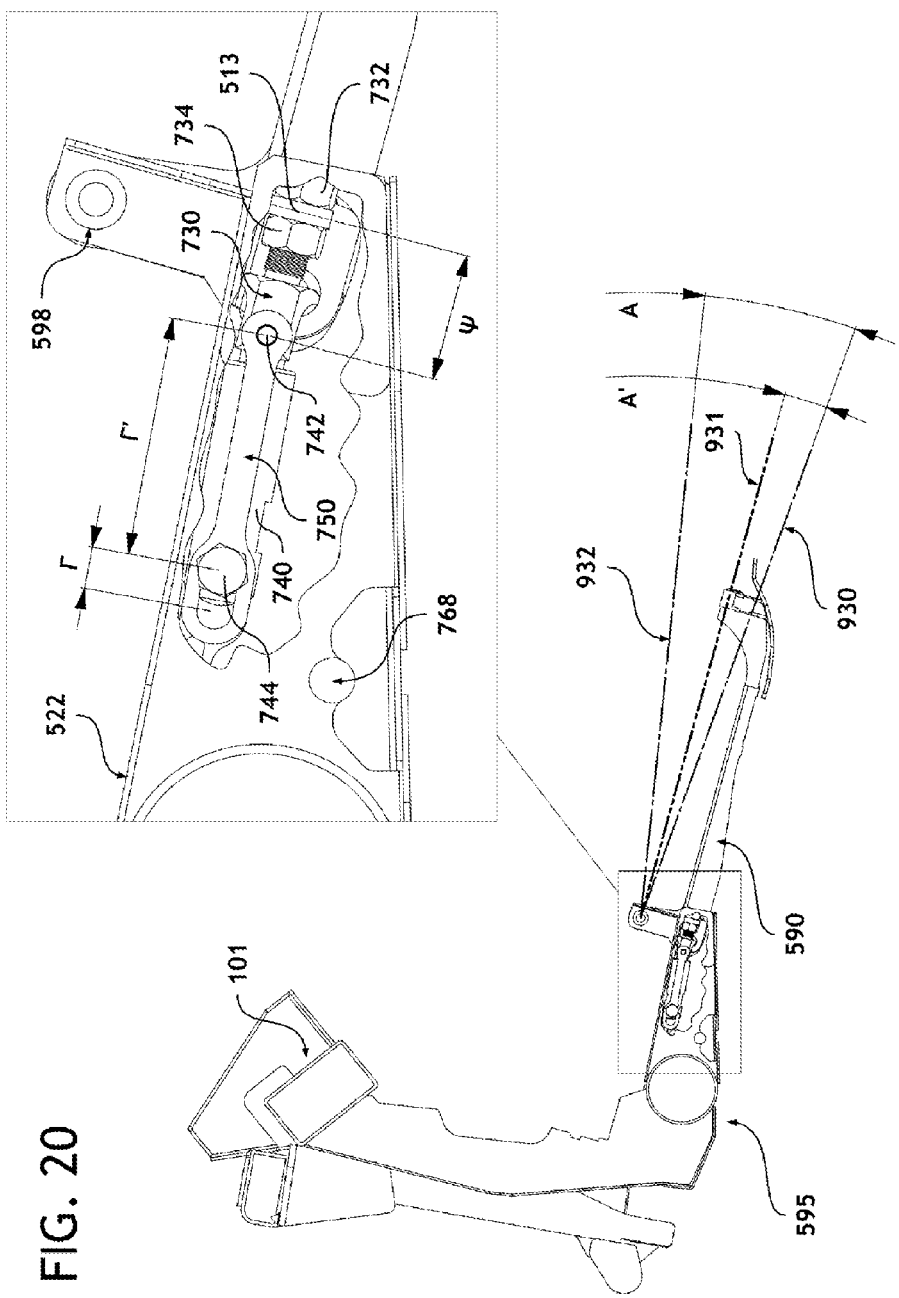
FIG. 20 is a detail side view of a central support arm isolated as illustrated in FIGS. 14-15, showing the range of angular positions it can adopt. A detail a cut is exhibited that reveals the constituent parts of the drive mechanism and the relationship of this with the position of said arm.
Figure 21:
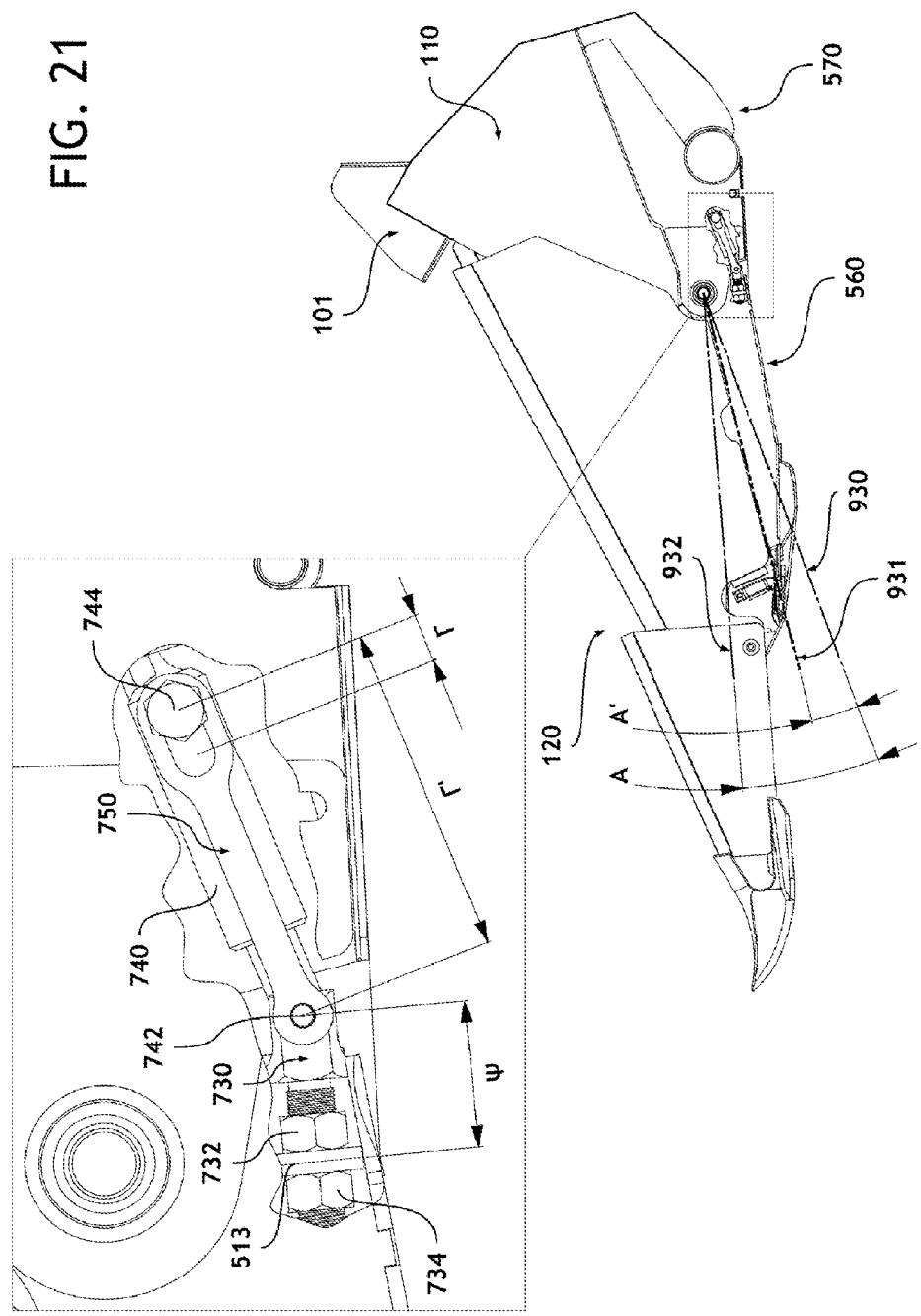
FIG. 21 is a detail side view of an outermost support arm with the side diver mounted on it as illustrated in FIGS. 1-2 & 10-13, showing the range of angular positions it can adopt. A detail a cut is exhibited that reveals the constituent parts of the drive mechanism and the relationship of this with the position of said arm.

In FIG. 18 it can be seen a preferred embodiment for a stop mechanism 750. A stop mechanism 750 is applied to each hydraulic cylinder 740 to limit the actuating range and, as it will be discussed later, to accuse the angular position of the corresponding pivoting member 510, 560, 590. In a preferred configuration, each stop mechanism 750 is made up of a right part 751 and a left part 755. A hole 753 on a first side of both parts 751, 755 connects the stop mechanism 750 to the piston rod 740 through a pin 742, while a shaped hole 752 on a second side connects both parts 751, 755 to the base of the piston 740 through a pin 744 (and consequently with the fixed section 520, 570, 592 of the support arms, as seen in FIGS. 19, 20 and 21). Thus, the piston 740 is displayed surrounded by two corresponding stops 751, 755 and can be seen that the amplitude of the oblong r is configured as the travel range r admitted piston 740 (FIGS. 19, 20 and 21). Consequently, looking at FIG. 17 and FIG. 19, it is illustrated how the travel range r is translated into the angular range A of the pivoting member 510 of the belt support arms 501. It is obvious now that the upper bound 932 and the lower bound 930 of the angular range A could be altered by modifying the distance between holes 753, 752 or by changing the shape of the hole 752 (and altering the amplitude of the oblong $\lceil$).

Another preferred aspects of the stop mechanism 750 is that one of its constituent parts have a third section with a hole 756. As shown in FIG. 18, the left part 755 has an oblong hole 756 on its rear end. This oblong has an amplitude $\Omega$ whose purpose will be discuses later.

In FIGS. 19-21 it is displayed the angular range A of articulated sections 510, 590 and 560, with the constituent parts for each type of support arm. For simplicity, the operation mode of the stop structure 750 will be explained as applied to a belt support arm 501. The pivotal section 510, while working sliding over the ground, is forced to swing around the pivot axis 910 (FIG. 6) to overcome ground unevenness and describes then an angle A' (measured between the lower 930 and the imaginary axis 931 which indicates the position of said articulated section 510). This position angle A' determines, in accordance with the stop mechanism 750, the working length $\lceil'$ of the hydraulic cylinder 740. Hydraulic cylinders 740 are configured to exert a force that dumps the cantilever loads over the pivoting members 510. Due to some other limitations, the stop structure 750 is then installed to the hydraulic cylinders 740 to delimit its operational range and guarantee that said pivoting members 510 will not exceed the bounds 932, 930 at work.

An important aspect of the present invention is referenced to the commanding fork 730. The threaded section 736 of said fork 730 is able, by shifting the position of the nut 732 and lock nut 734, to regulate the distance $\psi$ between its mounting plate 513 and the piston rod attaching pin 742. This way, this regulation $\psi$ determines the angular position of the angular range A relative the fixed section 520, namely, allows locating the permissible working travel A more upstream or more downstream. In other words, the threaded section 736 of the forks 730 permit to individually adjust (rotate) the position of the angular range A without affecting its amplitude. Then, it is possible to calibrate the full length of the cutterbar assembly 201 to become flat, with no curls, by only adjusting a set of nuts 732, 734.

As shown specifically in FIGS. 20 and 21, both the central support arms 550 and the outermost support arms 580 contain pistons 740 to lighten cantilever loads. Each one also have at least one stop structure 750 that limits the travel of said pistons and have a commanding fork 740. The modus operandi can be understood in the same way as the belt support arms 501 described above. Consequently, the individual control of the position $\psi$ of the fork 740 on each arm 501, 550, 580 allows the cutterbar assembly 201 to be leveled from multiple points.

Figure 22:
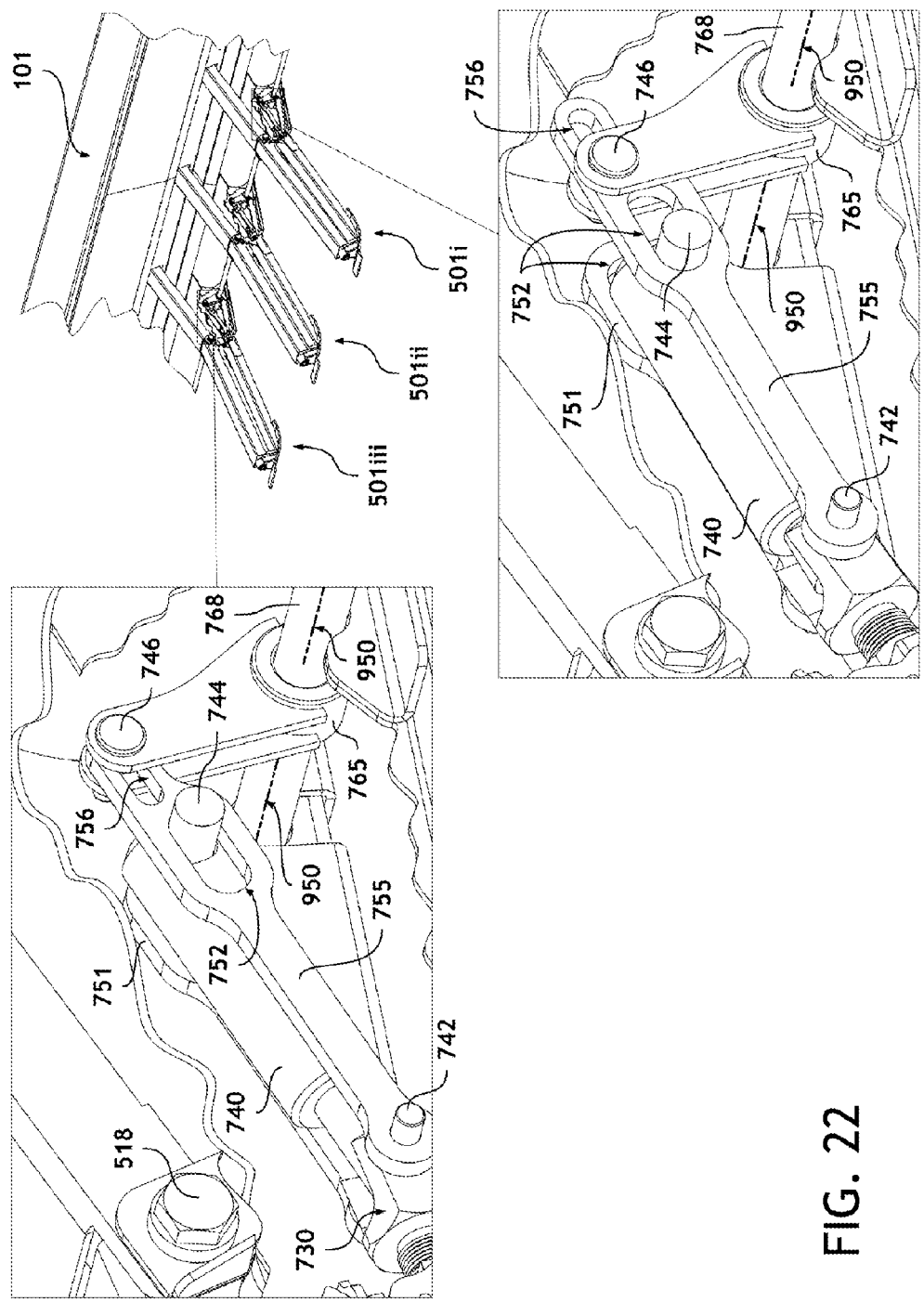
FIG. 22 is a detail top front perspective view of a set of belt support arms isolated in accordance with FIG. 18. Each of these arms is in a different angular position: (a) one all shifted upward, (b) one in an intermediate position and (c) one all shifted downward. It is also illustrated a detailed cut view of the shifted upward arm (a), where the behavior of the stop structure and its relation to the working angle sensor mechanism is revealed; and a detailed cut view of the shifted downward arm (c), where it is revealed how the cranks are free to pivot unimpeded from the stop structure.
Figure 23:
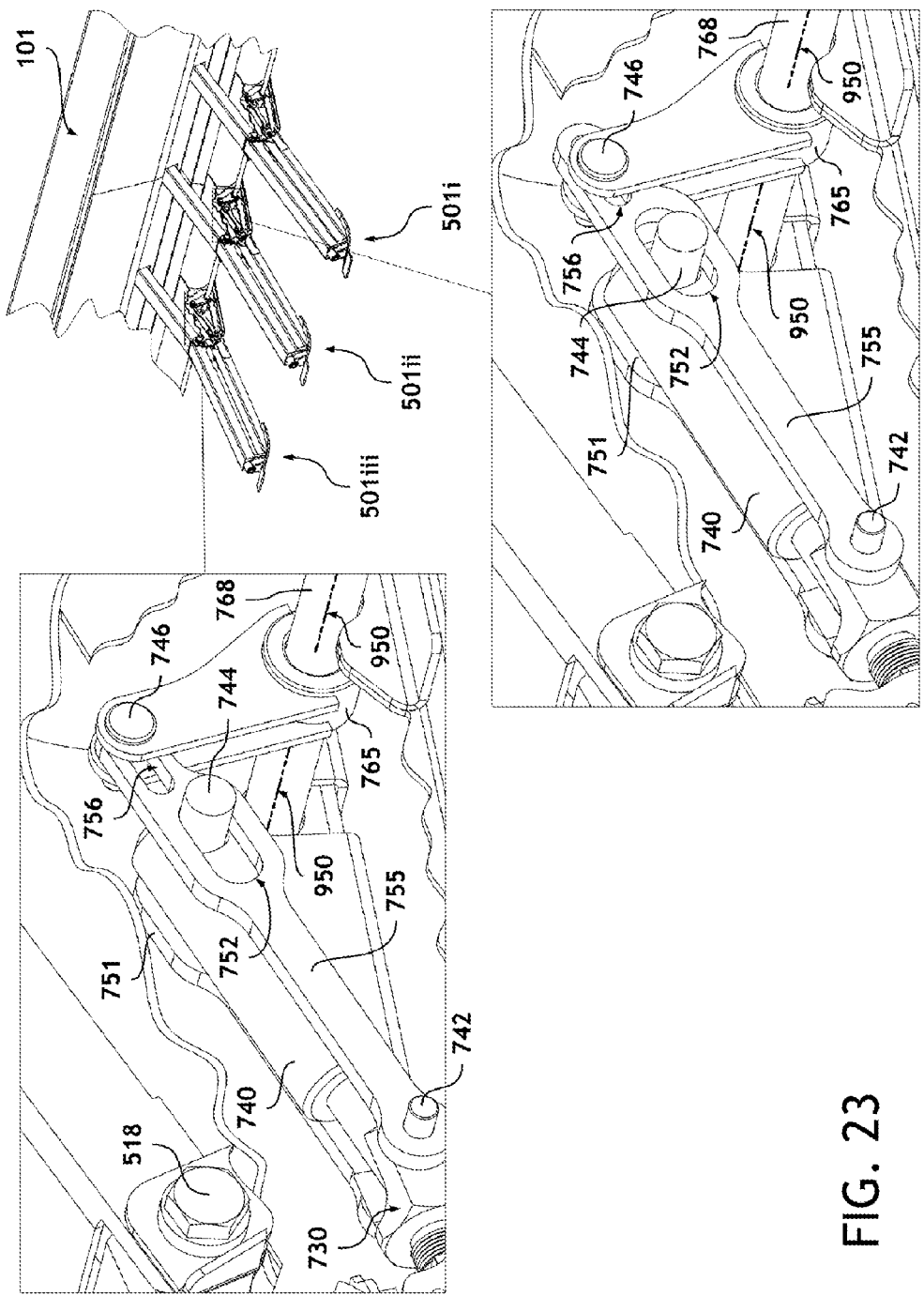
FIG. 23 is a detail view of the set of belt support arms of the FIG. 22. It is illustrated a detailed cut view of the shifted upward arm (a) and a detailed cut view of the half shifted arm (b)
Figure 24:
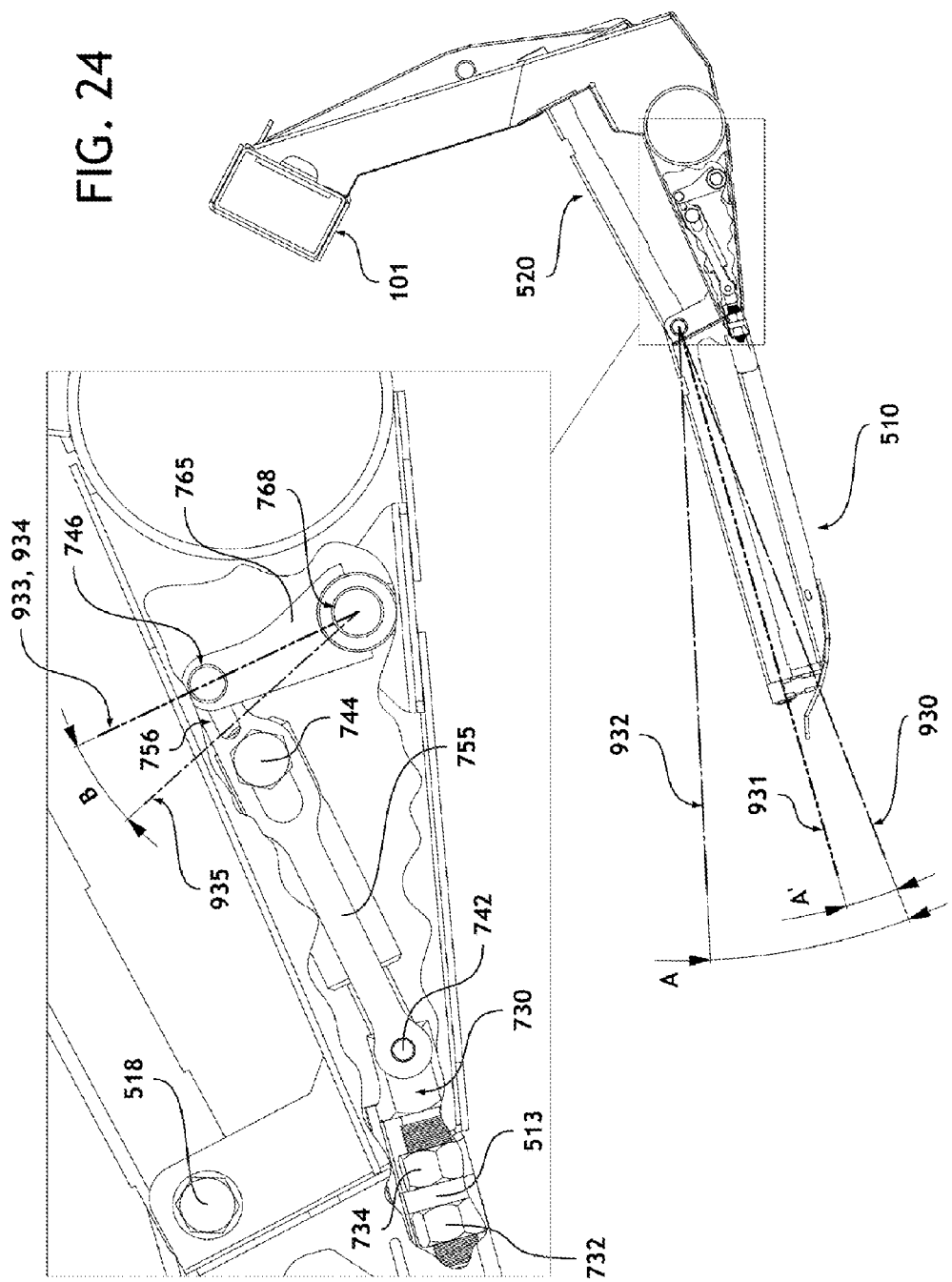

FIGS. 22-24 illustrate the method of operating the working angle sensor mechanism 760 and its relationship to the stop structure 750. It is valid the same comment made about explaining the operation of the stop structure 750, it will be illustrated the particular case of the belt support arms 501 but also applies to the central arm 580 and the outermost arms 550.

A plurality of cranks 765 is attached to a shaft 768 that extends transversely across a lower portion of the main frame 101 with respect to the normal direction of travel of the platform 100. Said cranks 765 (all) pivot jointly about the axis 950 of the shaft 768. In a preferred embodiment of the present invention, the angular range B allowed to the cranks 765 is determined by the width $\Omega$ of the shaped hole 756 on one stop structure part 755 (FIG. 18).

Initially all the cranks 765 are arranged fully displaced rearwards, with the coupling pins 746 in contact with the rear face the coupling hole 756 of the stop structure parts 755. It is noticed then that the starting angular position 934 of the crank 765 matches the lower bound 933 of its angular range B (shown in FIG. 24). When any of any of the belt support arms 501 is requested to swing, its position angle A' changes and the working length $\lceil'$ of its hydraulic cylinder 740 also does. If the working length $\lceil'$ of any hydraulic cylinder 740 is greater than the rest, the corresponding stop mechanism 750 forces the shaft 768 to rotate forward about the imaginary axis 950. The shape of the hole 756 (for coupling the cranks 765 to the stop mechanism 750) is constructed to allow the cranks 765 whose hydraulic cylinders extension $\lceil'$ remain unchanged (or that was modified less that one specific other) to freely pivot during work. In other words, to allow the coupling pins 746 to freely travel within said hole 756.

Both in FIG. 22 and FIG. 23 there is illustrated three belt support arms 501: the third belt support arm 501*iii* has been completely shifted upwards (its angular position A' matches the upper bound 932), the second belt support arm 501*ii* arm has been placed shifted somewhere between bounds 930 and 932, and the first belt support arm 501*i* has been completely shifted downwards (its angular position A' matches the lower bound 930). FIG. 22 compares the behavior of the stop mechanism 750 on a fully extended hydraulic cylinder 740 (third belt support arm 501*iii* fully up) to the stop mechanism 750 on a fully retracted hydraulic cylinder 740 (first belt support arm 501*i* fully down), all happening at the same time. FIG. 23 compares the behavior of the stop mechanism 750 on a fully extended hydraulic cylinder 740 (third belt support arm 501*iii* fully up) to the stop mechanism 750 on a half extended hydraulic cylinder 740 (second belt support arm 501*ii* partially up), all happening at the same time.

In the detail views of FIG. 22 it can be seen how the holes 752, 756 on the stop mechanism 750 behave. The third belt support arm 501*iii* detail view shows how the arm forced the set of cranks 765 to rotate forward (up to 935 position, see FIG. 24), while the second belt support arm 501*i* detail view shows how the hole 756 on the second part 755 of the stop mechanism 750 permitted the cranks 765 move freely even when the arm corresponding 501*i* is in an antagonistic position. The bolts 744 on the rear end of the hydraulic cylinders 740 relative to the holes 752 of the stop mechanism 750 reveal that in both detail views the extension [' of each hydraulic cylinder 740 is different.

In the detail views of FIG. 23 it can be seen how the holes 752, 756 on the stop mechanism 750 behave relative to a half-actuated belt support arm 501. The third belt support arm 501*iii* detail view shows the hydraulic cylinder 740 fully extended forcing the cranks 765 to rotate all the way forward (to position 935, see FIG. 24), while the second belt support arm 501*i* detail view shows how the hole 756 on the second part 755 of the stop mechanism 750 permitted the cranks 765 move freely.

Finally, it should be added that the pivotal movement of the shaft 768 is transmitted to a position sensing element (not shown), responsible for determining different parameter values (i. e. voltage) to match the changing the angular position 731 of the cranks 765. This value is read by the combine tractor (not shown) to which the platform 100 is attached to and is used by the latter to control the working height and the lateral tilt of the platform 100.

The preferred forms of the invention described above are to be used as illustration only, and should not be utilized in a limiting sense when interpreting the scope of the present invention. Some alterations to the exemplary embodiments described above could be readily made by those skilled in the art without departing from the spirit of the present invention.

The inventor hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. An agricultural platform (100) used to harvest crops, said platform operable to be supported at an open end that is configured to receive severed crop materials, said platform comprising:
    a main frame (101) operable to be mounted to the open end (102), said main frame comprising a central section (160) located adjacent to said open end, and comprising right and left lateral sections (162) at the sides of said central section extending transversely with respect to the normal direction of travel (V) of the platform;
    a cutterbar assembly (201) to extend lengthwise through said lateral and central regions; said cutterbar assembly being operable to flex along the length thereof in response to changes in terrain as the header is advanced;
    a plurality of laterally spaced apart belt support arms (501) having at a first portion a first pivoting sections (510) and at a second portion a second rigid section (520), wherein each of said plurality of arms extends in a forward direction,
    said first pivoting sections (510) being pivotally coupled to the second rigid sections (520) at its rear end such that each first pivoting section is constrained to pivot up and down at its front end with respect to the main frame (101),
    said second rigid sections (520) being coupled to the main frame (101) at its rear end and projects substantially forward such that a pivotal joint with the pivoting sections (510) is displaced forwardly with respect to the main frame (101),
    the front ends of the first pivoting sections (510) of said belt support arms (501) being attached to and cooperatively supporting the cutterbar assembly (201); and
    a draper conveyor assembly (400) comprising lateral belt conveyors disposed behind the cutterbar assembly on the lateral sections (162) to convey cut crop material laterally inwardly toward the central section (160).

2. The agricultural platform according to claim 1, wherein the first pivoting sections (510) of the belt support arms (501) determines a front region (164);
    wherein the second rigid sections (520) of the belt support arms (501) determines a rear region (166);
    wherein the draper conveyor assembly (400) comprising a set of flexible belts (410) disposed at said front region (164) and comprising a set of rigid belts (420) disposed at said rear region (166);
    wherein said flexible belts (410) being supported by the first pivoting sections (510) of the belt support arms (501) so that they are operable to flex therewith; and
    wherein said rigid belts (420) being supported by the rigid sections (520) of the belt support arms (501).

3. The agricultural platform according to claim 2, wherein each first pivoting section (510) of the belt support arms (501) comprising an upper beam (511) and a lower beam (512);
    wherein the upper runs (411) of said flexible belts (410) being operable to slide over the upper beams (511); and
    wherein the lower runs (412) of said flexible belts (410) being operable to slide over the lower beams (512).

4. The agricultural platform according to claim 2, wherein each second fixed section (520) of the belt support arms (501) comprising an upper beam (521) and a lower beam (522);
    wherein the upper runs (421) of said fixed belts (420) being operable to slide over the upper beams (521); and
    and wherein the lower runs (422) of said fixed belts (420) being operable to slide over the lower beams (512).

5. The agricultural platform according to claim 1, wherein said cutterbar assembly (201) further comprising a plurality of slip plates (211) spaced along its length and spaced apart from one another;
    each slip plate (211) extend rearwardly and downwardly and is operable as the engaging member between the cutterbar bar assembly (201) and the ground (199); and
    each first pivoting section (510) of the belt support arms (501) being connected at its forward end with a slip plates (211), wherein the joint between the pivoting section to the skid plate is made by a resilient material (220).

6. The agricultural platform according to claim 1, wherein said plurality of belt support arms (501) further including a pair of outermost lateral support arms (550), wherein each outermost lateral support arm (550) comprises a rotary joint (568), with a first member (560) projecting forward from said rotary joint (568) and a second member (570) projecting rearward from said rotary joint (568);
   wherein said outermost lateral support arms (550) being pivotally coupled to the main frame (101) by the rotary joint (568);
   wherein each lateral belt conveyors presenting laterally endmost margins, said laterally endmost margins being supported on a roller; and
   wherein each outermost lateral support arm (550) being positioned laterally outside one of the endmost margins of the lateral belt conveyor and supporting a respective one of the outermost ends of the cutterbar assembly (201) to permit flexing thereof as the platform (100) is advanced.

7. The agricultural platform according to claim 6, further comprising at least one cutterbar drive including a drive element (284) and a forward gearbox (280) drivingly connected between the drive element and the cutterbar assembly (201) to provide driving power from the drive element to the cutterbar assembly;
   said forward gearbox (280) being supported on the first member (560) of one of the outermost lateral support arms (550) so that the forward gearbox and the drive element pivots around the corresponding rotary joint (568) when an adjacent portion of the cutterbar assembly flexes.

8. The agricultural platform according to claim 7, wherein said drive element (284) being a flywheel that substantially eliminates the cyclical torque load from said cutterbar assembly (201) or said forward gearbox (280); or
   wherein the diameter of said drive element (284) being equal to or less than the width of the corresponding outermost lateral support arm (550); or
   wherein said drive element (284) being a high inertia, low mass hollow cylinder.

9. The agricultural platform according to claim 7, wherein the connection between said drive element (284) and said forward gearbox (280) is made by a resilient material (288) operable as a torsion dampener and an axial offset compensating member.

10. The agricultural platform according to claim 7, wherein said cutterbar drive further including a rear gearbox (130) supported on the second member (570) of the outermost lateral support arm (550) so that the forward gearbox (280), the drive element (284) and the rear gearbox pivot around the rotary joint (568) when an adjacent portion of the cutterbar assembly flexes.

11. The agricultural platform according to claim 10, wherein the input shaft of said forward gearbox (280) having an axis of rotation;
   the output shaft of said rear gearbox (130) having an axis of rotation; and
   the drive element (284) having an axis of rotation being aligned to the axis of rotation of the input shaft of the forward gearbox and to the axis of rotation of the output shaft of the rear gearbox.

12. The agricultural platform according to claim 10, wherein the connection between said drive element (284) and said rear gearbox (130) is made by a resilient material (288) operable as a torsion dampener and an axial offset compensating member.

13. The agricultural platform according to claim 10, wherein said cutterbar drive further comprising a rear shaft (279) rotary fixed to the main frame (101) and a drive shaft (274) drivingly connected between the rear shaft (279) and the input shaft of the rear gearbox (130).

14. The agricultural platform according to claim 12, wherein said drive shaft (274) being a telescopic shaft with universal joints (278) on it ends to accommodate the pivoting movement of the outermost lateral support arm (550); or
   wherein said drive shaft (274) further includes an overload protecting clutch device.

15. The agricultural platform according to claim 1, wherein at least one of said belt support arms (501) being located in the central section (160) of the main frame (101) and configured as a central support arm (580) operable to hold up the portion of the cutterbar assembly (201) located at said central section;
   each lateral belt conveyors presenting laterally endmost margins, said laterally endmost margins being supported on a roller; and
   said central support arm (580) being positioned laterally outside the lateral belt conveyors and between the endmost margins adjacent to the central section.

16. The agricultural platform according to claim 15, wherein said belt support arms (501) having an axis of rotation (910);
   said central support arm (580) having an axis of rotation (912); and
   the axis of rotation (910) of said belt support arms (501) being coincident with the axis of rotation (912) of said central support arm (580).

17. The agricultural platform according to claim 15, wherein the pivoting section (590) of said central support arm (580) comprising a first beam (585) and a second beam (586);
   the rigid section (592) of said central support arm (580) comprising a first member (587) and a second member (588);
   the forward end of the first member (587) of said rigid section (592) including a track (524) operable to permit an object to run over it; and
   the rearward end of the first beam (585) of said pivoting section (590) being operable to slide over the track (524) of said first member (587) when the pivoting section (590) is requested to rotate.

18. The agricultural platform according to claim 15, wherein the distance between said central support arm (580) and the belt support arms (501) laterally adjacent to the first is substantially the same; and
   said cutterbar assembly (201) being held at substantially equidistant points so that it is operable to flex into multiple inflection points substantially equidistant through all its length.

19. The agricultural platform according to claim 1, further comprising a plurality of linear actuators (740) extending parallel to the belt support arms (501), wherein each linear actuator is rotably supported from a rearward end to the rigid section (520) of said belt support arms; and
   a plurality of Y-shaped adjusting members (730) attached to the rear end of the pivoting section (510) of the belt support arms, wherein each adjusting member is pivotally joint to the forward end of a linear actuator (740);
   said linear actuators (740) exert a force against the corresponding pivoting section (510) of the belt support arms via an adjusting member (730), wherein said linear actuators are operable to partially cancel the cantilever loads of the cutterbar assembly (201) so that said cutterbar assembly is light to flex.

20. The agricultural platform according to claim 19, further comprising a plurality of stop mechanisms (750) operable to limit the extension range of linear actuators (740); and said stop mechanisms (750) each one comprising a rod-shaped part (755) linked by its forward and rearward ends to the forward and rearward ends of a linear actuator; and wherein one of the links to linear actuator is made by an oval-shaped slot link (752) configured such that the length ($\Gamma$) of said oval-shaped slot link defines the extension range of the linear actuator (740).

21. The agricultural platform according to claim 19, wherein said adjusting members (730) having a threaded body (736) by which it is connected to the pivoting section (510);

said threaded body (736) being locked to a sheet member (513) of the rearward end of the pivoting section (510) by a nut (732) and a lock nut (734);

said nut (732) and said lock nut (734) being configured to adjust the extension ($\psi$) of the adjusting member (730) rearwards the sheet member (513); and said extension ($\psi$) defines the angular position (A') of the corresponding pivoting section (510) independently from the extension length ($\Gamma'$) of the linear actuator (740), wherein said nut (732) and said lock nut (734) allow to level the cutterbar assembly (201) without disassembling.

22. The agricultural platform according to claim 19, further comprising multiple position sensing mechanisms (760), wherein each position sensing mechanism comprises a plurality of laterally spaced cranks (765) aligned one another and attached to a shaft (768) and comprises an angle sensor;

said rod-shaped part (755) including a second oval-shaped slot link (756);

each angle sensing mechanism (760) being engaged to a set of belt supports arms (501), wherein the heads of the cranks are linked to the second oval-shaped slot link (756) of a rod-shaped part (755); and each second oval-shaped slot link (756) is operable to force the corresponding shaft (768) to rotate when the corresponding pivoting section (510) pivots.

* * * * *